(12) United States Patent
Sridharan et al.

(10) Patent No.: US 12,335,879 B2
(45) Date of Patent: Jun. 17, 2025

(54) POWER HEADROOM REPORTING FOR UPLINK CARRIER AGGREGATION COMMUNICATIONS

(71) Applicant: QUALCOMM Incorporated, San Diego, CA (US)

(72) Inventors: Gokul Sridharan, Sunnyvale, CA (US); Kazuki Takeda, Tokyo (JP); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 17/895,805

(22) Filed: Aug. 25, 2022

(65) Prior Publication Data
US 2024/0073830 A1  Feb. 29, 2024

(51) Int. Cl.
*H04W 52/00* (2009.01)
*H04W 52/14* (2009.01)
*H04W 52/36* (2009.01)

(52) U.S. Cl.
CPC ....... *H04W 52/365* (2013.01); *H04W 52/146* (2013.01)

(58) Field of Classification Search
CPC .................. H04W 52/365; H04W 52/146
See application file for complete search history.

(56) References Cited

U.S. PATENT DOCUMENTS 9,055,564 B2 * 6/2015 Ahn ..................... H04W 52/365
2014/0036879 A1 * 2/2014 Pirskanen ........... H04W 52/365
                                                                370/336

FOREIGN PATENT DOCUMENTS

EP        2645762 A1 * 10/2013 ............. H04L 5/001
WO    WO-2011150361 A1    12/2011
WO    WO-2011159123 A2    12/2011

OTHER PUBLICATIONS

International Search Report and Written Opinion—PCT/US2023/072461—ISA/EPO—Dec. 5, 2023.

(Continued)

*Primary Examiner* — Erika A Washington
(74) *Attorney, Agent, or Firm* — Holland & Hart LLP

(57) ABSTRACT

Methods, systems, and devices for wireless communications are described. In some systems, a user equipment (UE) may report power headroom for uplink carrier aggregation communications. The UE may receive a first message that indicates multiple component carriers are configured for communications at the UE. The UE may determine a first transmission power available for uplink carrier aggregation transmissions by the UE across the multiple component carriers during a transmission occasion. The UE may transmit one or more uplink messages associated with a second transmission power via one or more of the component carriers. The UE may transmit a power headroom report that includes a carrier aggregation power headroom parameter. A value of the carrier aggregation power headroom parameter may be based on the first transmission power and the second transmission power associated with uplink carrier aggregation transmissions via at least one of the multiple component carriers during the transmission occasion.

30 Claims, 20 Drawing Sheets

(56) References Cited

OTHER PUBLICATIONS

Lenovo, et al., "PHR for NR CA", 3GPP TSG-RAN WG2 Meeting #99bis, R2-1711032, 3rd Generation Partnership Project, Mobile Competence Centre, 650, Route Des Lucioles, F-06921 Sophia-Antipolis Cedex, France, vol. RAN WG2, No. Prague, Czech Republic, Oct. 9, 2017-Oct. 13, 2017, Sep. 28, 2017, 4 Pages, XP051354428, The Whole Document.

Motorola Mobility, et al., "On NR Power Control", 3GPP TSG RAN WG1 #90-Bis, R1-1718704, 3rd Generation Partnership Project, Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, 9 Pages, Oct. 3, 2017, XP051353205, p. 2-p. 3.

\* cited by examiner

POWER HEADROOM REPORTING FOR UPLINK CARRIER AGGREGATION COMMUNICATIONS

FIELD OF TECHNOLOGY

The following relates to wireless communications, including power headroom reporting for uplink carrier aggregation communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, a UE may be configured to report power headroom information. The UE may transmit one or more power headroom reports to a network entity. The power headroom reports may each indicate an amount of power available for uplink transmissions by the UE via a respective component carrier.

SUMMARY

The described techniques relate to improved methods, systems, devices, and apparatuses that support power headroom reporting for uplink carrier aggregation communications. For example, the described techniques provide for a user equipment (UE) to report an amount of transmission power available for uplink communications by the UE across multiple component carriers. The UE may be configured to support uplink carrier aggregation, and the UE may receive a message that indicates the multiple component carriers configured for the carrier aggregation communications at the UE. The UE may determine the amount of transmission power available for uplink carrier aggregation transmissions by the UE across the multiple component carriers during a transmission occasion based on one or more parameters. The transmission power (e.g., a maximum transmission power level) may be referred to as a carrier aggregation transmission power in some aspects described herein. The UE may transmit at least one power headroom report that includes a carrier aggregation power headroom parameter. The UE may transmit the power headroom report via one or more of the component carriers configured for communications at the UE. A value of the carrier aggregation power headroom parameter may be based on the carrier aggregation transmission power available for uplink transmissions across the multiple component carriers and a second transmission power associated with uplink carrier aggregation transmissions via at least one of the component carriers during the transmission occasion. The UE may thereby report a headroom to a total amount of power available for uplink component carrier aggregation communications, which may improve coordination between devices, throughput, and reliability of the uplink communications.

A method for wireless communications at a UE is described. The method may include receiving a first message indicating a set of multiple component carriers are configured for communications at the UE, determining a first transmission power available for uplink carrier aggregation transmissions by the UE across the set of multiple component carriers during a transmission occasion, and transmitting, via at least a first component carrier of the set of multiple component carriers, a power headroom report including a carrier aggregation power headroom parameter, where a value of the carrier aggregation power headroom parameter is based on the first transmission power available across the set of multiple component carriers during the transmission occasion and a second transmission power associated with the uplink carrier aggregation transmissions via at least one component carrier of the set of multiple component carriers during the transmission occasion.

An apparatus for wireless communications at a UE is described. The apparatus may include a processor, memory coupled with the processor, and instructions stored in the memory. The instructions may be executable by the processor to cause the apparatus to receive a first message indicating a set of multiple component carriers are configured for communications at the UE, determine a first transmission power available for uplink carrier aggregation transmissions by the UE across the set of multiple component carriers during a transmission occasion, and transmit, via at least a first component carrier of the set of multiple component carriers, a power headroom report including a carrier aggregation power headroom parameter, where a value of the carrier aggregation power headroom parameter is based on the first transmission power available across the set of multiple component carriers during the transmission occasion and a second transmission power associated with the uplink carrier aggregation transmissions via at least one component carrier of the set of multiple component carriers during the transmission occasion.

Another apparatus for wireless communications at a UE is described. The apparatus may include means for receiving a first message indicating a set of multiple component carriers are configured for communications at the UE, means for determining a first transmission power available for uplink carrier aggregation transmissions by the UE across the set of multiple component carriers during a transmission occasion, and means for transmitting, via at least a first component carrier of the set of multiple component carriers, a power headroom report including a carrier aggregation power headroom parameter, where a value of the carrier aggregation power headroom parameter is based on the first transmission power available across the set of multiple component carriers during the transmission occasion and a second transmission power associated with the uplink carrier aggregation transmissions via at least one component carrier of the set of multiple component carriers during the transmission occasion.

A non-transitory computer-readable medium storing code for wireless communications at a UE is described. The code may include instructions executable by a processor to receive a first message indicating a set of multiple component carriers are configured for communications at the UE, determine a first transmission power available for uplink carrier aggregation transmissions by the UE across the set of multiple component carriers during a transmission occasion, and transmit, via at least a first component carrier of the set of multiple component carriers, a power headroom report including a carrier aggregation power headroom parameter, where a value of the carrier aggregation power headroom parameter is based on the first transmission power available across the set of multiple component carriers during the transmission occasion and a second transmission power associated with the uplink carrier aggregation transmissions via at least one component carrier of the set of multiple component carriers during the transmission occasion.

Some examples of the method, apparatuses, and non-transitory computer-readable medium described herein may further include operations, features, means, or instructions for transmitting an uplink message via at least the first component carrier of the set of multiple component carriers, the uplink message associated with the second transmission power and calculating a difference between the first transmission power available across the set of multiple component carriers and the second transmission power, where the value of the carrier aggregation power headroom parameter indicates the difference.

In some examples of the method, apparatuses, and non-transitory computer-readable medium described herein, transmitting the power headroom report may include operations, features, means, or instructions for transmitting, via the power headroom report, the carrier aggregation power headroom parameter and a second power headroom parameter, where a value of the second power headroom parameter may be based on a difference between a third transmission power available for uplink transmissions on the first component carrier and the second transmission power.

Some examples of the method, apparatuses, and non-transitory computer-readable medium described herein may further include operations, features, means, or instructions for transmitting a second uplink message via a second component carrier of the set of multiple component carriers, calculating a second difference between the first transmission power available across the set of multiple component carriers and a third transmission power associated with the second component carrier, and transmitting, via the second uplink message, a second carrier aggregation power headroom parameter, where a value of the second carrier aggregation power headroom parameter indicates the second difference.

Some examples of the method, apparatuses, and non-transitory computer-readable medium described herein may further include operations, features, means, or instructions for determining the second transmission power, the second transmission power corresponding to an amount of transmission power available for uplink transmissions on the first component carrier, where the value of the carrier aggregation power headroom parameter indicates a difference between the first transmission power available across the set of multiple component carriers and the second transmission power.

In some examples of the method, apparatuses, and non-transitory computer-readable medium described herein, the value of the carrier aggregation power headroom parameter indicates the first transmission power available for the uplink carrier aggregation transmissions by the UE across the set of multiple component carriers during the transmission occasion.

Some examples of the method, apparatuses, and non-transitory computer-readable medium described herein may further include operations, features, means, or instructions for transmitting one or more uplink messages corresponding to the uplink carrier aggregation transmissions, each uplink message of the one or more uplink messages transmitted via a respective component carrier of the set of multiple component carriers and using a respective second transmission power and calculating a difference between the first transmission power available across the set of multiple component carriers and a sum of the respective second transmission powers used for transmitting each of the one or more uplink messages, where the value of the carrier aggregation power headroom parameter indicates the difference.

Some examples of the method, apparatuses, and non-transitory computer-readable medium described herein may further include operations, features, means, or instructions for calculating the sum of the respective second transmission powers and one or more reference power levels, the one or more reference power levels associated with a subset of component carriers of the set of multiple component carriers that may be different than the respective component carriers via which the one or more uplink messages may be transmitted, where the one or more reference power levels may be based on a reference power reduction parameter.

Some examples of the method, apparatuses, and non-transitory computer-readable medium described herein may further include operations, features, means, or instructions for receiving a control message that allocates a set of uplink channel resources for carrier aggregation power headroom reporting, where the power headroom report may be transmitted via the set of uplink channel resources based on the control message.

In some examples of the method, apparatuses, and non-transitory computer-readable medium described herein, transmitting the power headroom report may include operations, features, means, or instructions for transmitting the power headroom report via the first component carrier and a first cell, where the first component carrier and the first cell may be configured for carrier aggregation power headroom reporting by the UE.

In some examples of the method, apparatuses, and non-transitory computer-readable medium described herein, transmitting the power headroom report may include operations, features, means, or instructions for transmitting the power headroom report based on an expiration of a power headroom report timer, where the power headroom report timer includes a periodic timer, a prohibit timer, or both configured for power headroom reporting by the UE.

Some examples of the method, apparatuses, and non-transitory computer-readable medium described herein may further include operations, features, means, or instructions for determining to transmit the power headroom report via a set of resources allocated for power headroom reporting on the first component carrier based on the set of resources being after the expiration of the power headroom report timer and before other sets of resources allocated for power headroom reporting on other component carriers of the set of multiple component carriers.

In some examples of the method, apparatuses, and non-transitory computer-readable medium described herein, the power headroom report timer includes the periodic timer, a periodicity of the periodic timer configured for carrier aggregation power headroom reporting, per-carrier power headroom reporting, or both.

Some examples of the method, apparatuses, and non-transitory computer-readable medium described herein may further include operations, features, means, or instructions for determining a difference between a first pathloss associated with at least one component carrier of the set of multiple component carriers at a first time and a second pathloss associated with the at least one component carrier at a second time and comparing the difference with a pathloss threshold, where transmitting the power headroom report may be based on the difference exceeding the pathloss threshold.

Some examples of the method, apparatuses, and non-transitory computer-readable medium described herein may further include operations, features, means, or instructions for determining a difference between a first value of a first maximum power reduction (MPR) parameter associated with at least one component carrier of the set of multiple component carriers at a first time and a second value of the first MPR parameter associated with the at least one component carrier at a second time and comparing the difference with a power reduction threshold, where transmitting the power headroom report may be based on the difference exceeding the power reduction threshold.

A method for wireless communications at a network entity is described. The method may include transmitting a first message indicating a set of multiple component carriers are configured for communications at a UE, receiving, via a first component carrier of the set of multiple component carriers and during a transmission occasion, an uplink message associated with a second transmission power, and receiving, via at least the first component carrier of the set of multiple component carriers, a power headroom report including a carrier aggregation power headroom parameter, where a value of the carrier aggregation power headroom parameter is based on a first transmission power available for uplink transmissions by the UE across the set of multiple component carriers during the transmission occasion and the second transmission power associated with uplink carrier aggregation transmissions via at least the first component carrier during the transmission occasion.

An apparatus for wireless communications at a network entity is described. The apparatus may include a processor, memory coupled with the processor, and instructions stored in the memory. The instructions may be executable by the processor to cause the apparatus to transmit a first message indicating a set of multiple component carriers are configured for communications at a UE, receive, via a first component carrier of the set of multiple component carriers and during a transmission occasion, an uplink message associated with a second transmission power, and receive, via at least the first component carrier of the set of multiple component carriers, a power headroom report including a carrier aggregation power headroom parameter, where a value of the carrier aggregation power headroom parameter is based on a first transmission power available for uplink transmissions by the UE across the set of multiple component carriers during the transmission occasion and the second transmission power associated with uplink carrier aggregation transmissions via at least the first component carrier during the transmission occasion.

Another apparatus for wireless communications at a network entity is described. The apparatus may include means for transmitting a first message indicating a set of multiple component carriers are configured for communications at a UE, means for receiving, via a first component carrier of the set of multiple component carriers and during a transmission occasion, an uplink message associated with a second transmission power, and means for receiving, via at least the first component carrier of the set of multiple component carriers, a power headroom report including a carrier aggregation power headroom parameter, where a value of the carrier aggregation power headroom parameter is based on a first transmission power available for uplink transmissions by the UE across the set of multiple component carriers during the transmission occasion and the second transmission power associated with uplink carrier aggregation transmissions via at least the first component carrier during the transmission occasion.

A non-transitory computer-readable medium storing code for wireless communications at a network entity is described. The code may include instructions executable by a processor to transmit a first message indicating a set of multiple component carriers are configured for communications at a UE, receive, via a first component carrier of the set of multiple component carriers and during a transmission occasion, an uplink message associated with a second transmission power, and receive, via at least the first component carrier of the set of multiple component carriers, a power headroom report including a carrier aggregation power headroom parameter, where a value of the carrier aggregation power headroom parameter is based on a first transmission power available for uplink transmissions by the UE across the set of multiple component carriers during the transmission occasion and the second transmission power associated with uplink carrier aggregation transmissions via at least the first component carrier during the transmission occasion.

In some examples of the method, apparatuses, and non-transitory computer-readable medium described herein, the value of the carrier aggregation power headroom parameter may be based on a difference between the first transmission power available across the set of multiple component carriers and the second transmission power associated with the uplink message received via the first component carrier.

In some examples of the method, apparatuses, and non-transitory computer-readable medium described herein, receiving the power headroom report may include operations, features, means, or instructions for receiving, via the power headroom report, the carrier aggregation power headroom parameter and a second power headroom parameter, where a value of the second power headroom parameter may be based on a difference between a third transmission power available for uplink transmissions on the first component carrier and the second transmission power.

Some examples of the method, apparatuses, and non-transitory computer-readable medium described herein may further include operations, features, means, or instructions for receiving a second uplink message via a second component carrier of the set of multiple component carriers and receiving, via the second uplink message, a second carrier aggregation power headroom parameter, where a value of the second carrier aggregation power headroom parameter indicates a second difference between the first transmission power available across the set of multiple component carriers and a third transmission power associated with the second component carrier.

In some examples of the method, apparatuses, and non-transitory computer-readable medium described herein, the value of the carrier aggregation power headroom parameter indicates a difference between the first transmission power available across the set of multiple component carriers and a second transmission power available for uplink transmissions via the first component carrier.

In some examples of the method, apparatuses, and non-transitory computer-readable medium described herein, the value of the carrier aggregation power headroom parameter indicates the first transmission power available across the set of multiple component carriers during the transmission occasion.

Some examples of the method, apparatuses, and non-transitory computer-readable medium described herein may further include operations, features, means, or instructions for receiving one or more uplink messages including at least the uplink message, each uplink message of the one or more uplink messages received via a respective component carrier of the set of multiple component carriers and associated with a respective second transmission power, where the value of the carrier aggregation power headroom parameter may be based on a difference between the first transmission power available across the set of multiple component carriers and a sum of the respective second transmission powers associated with each of the one or more uplink messages.

Some examples of the method, apparatuses, and non-transitory computer-readable medium described herein may further include operations, features, means, or instructions for transmitting a control message that allocates a set of uplink channel resources for carrier aggregation power headroom reporting, where the power headroom report may be received via the set of uplink channel resources based on the control message.

In some examples of the method, apparatuses, and non-transitory computer-readable medium described herein, receiving the power headroom report may include operations, features, means, or instructions for receiving the power headroom report via the first component carrier and a first cell, where the first component carrier and the first cell may be configured for carrier aggregation power headroom reporting.

In some examples of the method, apparatuses, and non-transitory computer-readable medium described herein, receiving the power headroom report may include operations, features, means, or instructions for receiving the power headroom report based on an expiration of a power headroom report timer, where the power headroom report timer includes a periodic timer, a prohibit timer, or both configured for power headroom reporting.

DETAILED DESCRIPTION

Figure 1:
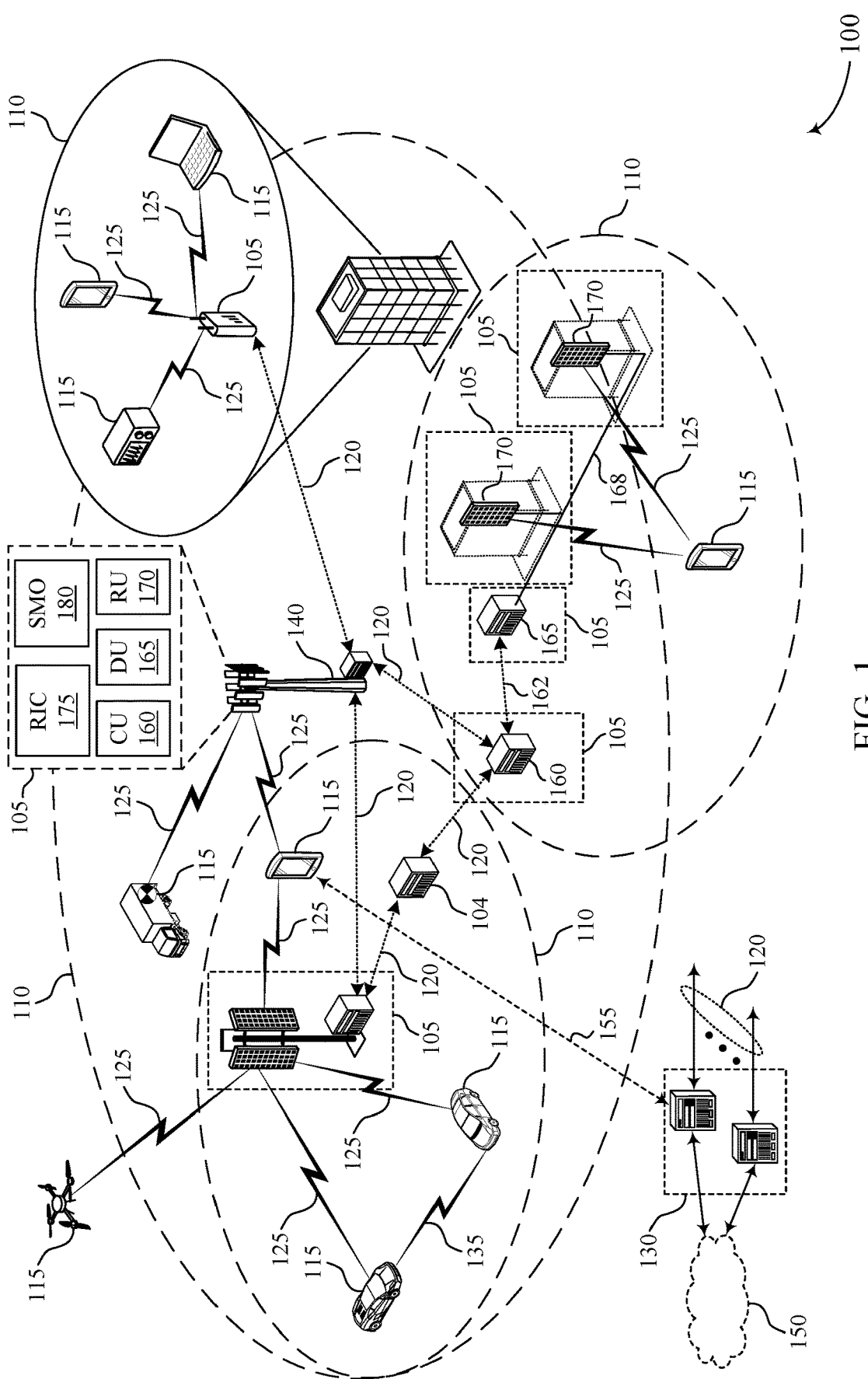
FIG. 1 illustrates an example of a wireless communications system that supports power headroom reporting for uplink carrier aggregation communications in accordance with one or more aspects of the present disclosure.

In some systems, a user equipment (UE) may report a power headroom associated with an amount of power available for uplink transmissions by the UE. A network entity may schedule communications with the UE based on the reported power headroom. The power headroom report may indicate an amount of power available for transmissions by the UE on a given component carrier, a difference between the amount of power available on the component carrier and an amount of power currently used by the UE for transmissions on the carrier, or both. Some UEs may support uplink carrier aggregation communications (e.g., communications via multiple component carriers). Such UEs may determine or calculate a total amount of power available at the respective UE for transmissions across all of the configured component carriers. Signaling for indicating the total amount of transmit power may improve coordination between the UE and a network entity, as well as improve throughput and reliability of uplink communications.

Techniques, systems, and devices described herein provide for a UE to transmit one or more power headroom reports that indicate a carrier aggregation transmission power, which may correspond to a maximum power level at which the UE is capable of transmitting across multiple component carriers configured for the UE at a given time (e.g., within a given transmission occasion during uplink carrier aggregation communications). The UE may determine the maximum power level that can be output by the UE across multiple component carriers in a given transmission occasion based on one or more parameters. In some aspects, the UE may transmit a power headroom report via each component carrier on which the UE transmits uplink communications, and the per-carrier power headroom reports may include one or more fields configured to indicate the carrier aggregation transmission power. For example, the per-carrier power headroom reports may each include a field to indicate the maximum power level available across multiple configured component carriers. Additionally, or alternatively, the per-carrier power headroom reports may each include a field to indicate a headroom between a current transmission level on a respective carrier and the maximum power level available across the multiple carriers.

In some other aspects, the UE may indicate the carrier aggregation transmit power via a single power headroom report transmitted on a first component carrier of the multiple component carriers configured for communications at the UE. The single power headroom report may be referred to as a carrier aggregation power headroom report in some aspects described herein. The carrier aggregation power headroom report may include one or more fields configured to indicate the maximum transmission power level available across the multiple component carriers. Additionally, or alternatively, the carrier aggregation power headroom report may include one or more fields configured to indicate a difference or headroom between the maximum transmission power level and a sum of transmission power levels used by the UE for transmissions across the multiple component carriers.

The UE may transmit the carrier aggregation power headroom report via uplink resources allocated for carrier aggregation power headroom reporting, via granted uplink resources available after expiration of a configured period of time, or both. The period of time may be based on a timer (e.g., a periodic timer, a prohibit timer, or both) that is configured for uplink carrier aggregation power headroom reporting. Additionally, or alternatively, the UE may reuse one or more timers configured for per-carrier power headroom reporting to determine the period of time. A UE as described herein may thereby indicate a total amount of transmission power that is available for uplink transmissions by the UE across multiple configured component carriers.

Aspects of the disclosure are initially described in the context of wireless communications systems. Additional aspects are described with reference to network architectures, power headroom report configurations, and process flows. Aspects of the disclosure are further illustrated by and described with reference to apparatus diagrams, system diagrams, and flowcharts that relate to power headroom reporting for uplink carrier aggregation communications.

FIG. 1 illustrates an example of a wireless communications system 100 that supports power headroom reporting for uplink carrier aggregation communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless selfbackhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support power headroom reporting for uplink carrier aggregation communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some aspects, a UE 115 may be configured to report power headroom. For example, a network entity 105 may transmit RRC signaling, or some other type of control signaling, that indicates a set of parameters for power headroom reporting. In some aspects, the power headroom reporting configuration may be indicated via an IE in the control signaling and configured across a group of one or more cells (e.g., indicated via a MAC-CellGroupConfig IE, or some other IE). The parameters for power headroom reporting that are indicated via the power headroom reporting configuration (e.g., phr-Config) may include one or more timers for power headroom reporting, a threshold change in power factor of a parameter for triggering a PHR report transmission (e.g., phr-Tx-PowerFactorChange), an indication of a format or a quantity of fields in a power headroom report (e.g., multiplePHR), a type of power headroom reporting (e.g., phr-Type2OtherCell), a mode of power headroom reporting (e.g., phr-ModeOtherCG), a configuration for maximum permissible exposure (MPE) reporting (e.g., mpe-Reporting-FR2-r16), one or more other parameters, or any combination thereof. The timers for power headroom reporting may include a periodic timer (e.g., phr-Periodic-Timer) that indicates a periodicity at which the UE 115 may transmit a power headroom report, a prohibit timer (e.g., phr-ProhibitTimer) that indicates a duration of time via which the UE 115 may refrain from transmitting a power headroom report, or both. The configuration for MPE reporting may indicate a timer (e.g., mpe-Prohi bit Timer-r16), a threshold for MPE reporting, or both.

A UE 115 that receives the power headroom reporting configuration may transmit one or more power headroom reports to the network entity 105 in accordance with the parameters indicated via the power headroom reporting configuration. Each power headroom report may be transmitted via a MAC-CE, or some other uplink message. In some cases, a power headroom MAC-CE may include multiple fields for indicating power headroom parameters. A headroom field in the power headroom MAC-CE may include a first quantity of bits (e.g., six bits, or some other quantity of bits) for indicating a power headroom for a given component carrier. Table 1 includes example values of power headroom levels that may be indicated via the headroom field (e.g., a range of 64 power headroom levels) and Table 2 includes example mappings between the value reported via the power headroom MAC-CE and a measured value of power headroom in decibels (dBs), in some aspects.

TABLE 1

Power Headroom Levels For Power Headroom Reporting

| Power Headroom | Power Headroom Level |
|---|---|
| 0 | POWER_HEADROOM_0 |
| 1 | POWER_HEADROOM_1 |

TABLE 1-continued

Power Headroom Levels For Power Headroom Reporting

| Power Headroom | Power Headroom Level |
|---|---|
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 2

Power Headroom Report Mapping

| Reported value | Measured quantity value (dB) |
|---|---|
| POWER_HEADROOM_0 | PH < −32 |
| POWER_HEADROOM_1 | −32 ≤ PH < −31 |
| POWER_HEADROOM_2 | −31 ≤ PH < −30 |
| POWER_HEADROOM_3 | −30 ≤ PH < −29 |
| ... | ... |
| POWER_HEADROOM_53 | 20 ≤ PH < 21 |
| POWER_HEADROOM_54 | 21 ≤ PH < 22 |
| POWER_HEADROOM_55 | 22 ≤ PH < 24 |
| POWER_HEADROOM_56 | 24 ≤ PH < 26 |
| POWER_HEADROOM_57 | 26 ≤ PH < 28 |
| POWER_HEADROOM_58 | 28 ≤ PH < 30 |
| POWER_HEADROOM_59 | 30 ≤ PH < 32 |
| POWER_HEADROOM_60 | 32 ≤ PH < 34 |
| POWER_HEADROOM_61 | 34 ≤ PH < 36 |
| POWER_HEADROOM_62 | 36 ≤ PH < 38 |
| POWER_HEADROOM_63 | PH ≥ 38 |

A second field in the power headroom MAC-CE may include a quantity of bits (e.g., six bits, or some other quantity of bits) configured to indicate an amount of power available for transmissions by the UE 115 on a given component carrier and a given serving cell, which may be represented by the parameter $P_{CMAX,f,c}$, where f may correspond to (e.g., point to) the carrier and c may correspond to (e.g., point to) the serving cell. $P_{CMAX,f,c}$ may be relatively granular information. For example, $P_{CMAX,f,c}$ may, in some cases, be the most granular information a UE 115 can provide to a network entity 105 related to an amount of available transmission power at the UE 115 (e.g., one dB resolution). Table 3 includes example values of $P_{CMAX,f,c}$ that may be included in the second field in the power headroom MAC-CE and Table 4 includes example mappings between the value reported via the $P_{CMAX,f,c}$ field in the power headroom MAC-CE and a measured value of $P_{CMAX,f,c}$ in decibels per milliwatt (dBm), in some aspects.

TABLE 3

Nominal UE Transmit Power Level For Power Headroom Reporting

| $P_{CMAX,f,c}$ | Nominal UE Transmit Power Level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

TABLE 4

Mapping of $P_{CMAX,f,c}$

| Reported Value | Measured Quantity Value | Unit |
|---|---|---|
| PCMAX_C_00 | $P_{CMAX,f,c}$ < −29 | dBm |
| PCMAX_C_01 | −29 ≤ $P_{CMAX,f,c}$ < −28 | dBm |
| PCMAX_C_02 | −28 ≤ $P_{CMAX,f,c}$ < −27 | dBm |
| ... | ... | ... |
| PCMAX_C_61 | −31 ≤ $P_{CMAX,f,c}$ < −32 | dBm |
| PCMAX_C_62 | −32 ≤ $P_{CMAX,f,c}$ < −33 | dBm |
| PCMAX_C_63 | −33 ≤ $P_{CMAX,f,c}$ | dBm |

The UE 115 may set a value of $P_{CMAX,f,c}$ (e.g., a configured maximum output power for a given carrier, f, and serving cell, c) within the following bounds: $P_{CMAX\_L,f,c} \leq P_{CMAX,f,c} \leq P_{CMAX\_H,f,c}$, where $P_{CMAX\_L,f,c}$ and $P_{CMAX\_H,f,c}$ may be determined by the UE 115 based on one or more defined parameters. The parameters may include, for example, a maximum transmission power configured by a network entity 105 for the UE 115 (e.g., $P_{EMAX}$), a maximum transmission power configured by a network entity 105 for the UE 115 in a given serving cell, c (e.g., $P_{EMAX,c}$) a maximum power determined based on a power class of the UE 115 (e.g., $P_{PowerClass}$), a change or delta in the maximum power associated with the power class of the UE 115 (e.g., $\Delta P_{PowerClass}$), a maximum power reduction (MPR) parameter, one or more other parameters configured for the UE 115, or any combination thereof.

The UE 115 may determine a transmit power to use for transmitting an uplink transmission (e.g., a physical uplink shared channel (PUSCH) transmission) in an active uplink bandwidth part (BWP), b, of a component carrier, f, and a serving cell, c, based on the value of $P_{CMAX,f,c}$, and according to Equation 1 below.

$$P_{PUSCH,b,f,c}(i, j, q_d, l) = \min \begin{cases} P_{CMAX,f,c}(i), \\ P_{O_{PUSCH,b,f,c}}(j) + 10\log_{10}(2^\mu M_{RB,b,f,c}^{PUSCH}(i)) + \\ \alpha_{b,f,c}(j)PL_{b,f,c}(q_{dd}) + \Delta_{TF,b,f,c}(i) + f_{b,f,c}(i, l) \end{cases}$$

Equation (1)

In the example of Equation 1, j may correspond to a parameter set index, l may correspond to a PUSCH power control adjustment state index, and i may correspond to a transmission occasion index. Accordingly, the UE 115 may utilize the value of $P_{CMAX,f,c}$ to determine a maximum level of power the UE 115 may use to transmit an uplink transmission in a given transmission occasion.

The power headroom field in the power headroom report transmitted by the UE 115 may indicate a difference between the maximum power per carrier, $P_{CMAX,f,c}$, and the transmit power used by the UE 115 on a given carrier, $P_{PUSCH,b,f,c}(i, j, q_d, l)$ For example, the power headroom field may be based on Equation 2 for each component carrier.

$$PH(i,j,q_d,l) = P_{CMAX,f,c} - P_{PUSCH,b,f,c}(i,j,q_d,l)$$

Equation (2)

A P field in the MAC-CE may indicate whether MPE information is being reported by the UE 115. If the P field is set to one and MPE reporting is configured via the power headroom reporting configuration for the UE 115, the UE 115 may indicate, via an MPE field in the power headroom report, an applied power backoff (e.g., a power management MPR (P-MPR) level) to meet one or more MPE requirements for the UE 115. If the P field is not set to one, if the MPE reporting is not configured in the power headroom reporting configuration, if the UE 115 operates in a frequency band that does not support MPE reporting (e.g., Frequency Range 1 (FR1)), or any combination thereof, the MPE field may be a reserved field, which may be empty or null (e.g., R bits may be present). Table 5 includes example values of the MPE field in the power headroom MAC-CE.

TABLE 5

| Effective Power Reduction For MPE P-MPR | |
| --- | --- |
| MPE | Nominal UE Transmit Power Level |
| 0 | P-MPR_00 |
| 1 | P-MPR_01 |
| 2 | P-MPR_02 |
| 3 | P-MPR_03 |

A MAC entity at the UE 115 may set the P field based on the P-MPR level applied to meet the MPE requirements. For example, if the applied P-MPR value is less than a threshold (e.g., P-MPR_00), the UE 115 may set the P field to zero. If the applied P-MPR value is greater than or the same as the threshold, the UE 115 may set the P field to one and report the P-MPR value via the MPE field. If MPE reporting is not configured in the power headroom reporting configuration or if the UE 115 operates in a frequency band that does not support MPE reporting (e.g., FR1), the P field may indicate whether power backoff is applied for power management. If the power backoff applied for power management affects a value of the $P_{CMAX,f,c}$ field, then the P field may be set to one. The P field may otherwise be set to zero.

The UE 115 may thereby receive the power headroom reporting configuration including one or more parameters for power headroom reporting, and the UE 115 may transmit one or more power headroom reports each including one or more bit fields to convey power headroom measurements or parameters, such as the examples illustrated in Tables 1-5. Each power headroom report may indicate headroom parameters for a respective component carrier. For example, the values of the bits in each of the P, power headroom, MPE, and $P_{CMAX,f,c}$ fields may be associated with communications on a single component carrier. In such cases, the UE 115 may transmit a power headroom report via each component carrier that is configured for communications at the UE 115.

Additionally, or alternatively, the UE 115 may generate and transmit a power headroom report that reports power headroom for more than two component carriers. For example, the combined power headroom report may include separate fields for reporting per-carrier power headroom information. An example combined power headroom report that includes a bitmap to indicate which component carriers power headroom is being reported for (using C1 to C7); an indication of whether a power backoff is being applied (using the P fields); an indication of whether the corresponding power headroom report is actual or virtual (using the V fields); reserved fields denoted by the R fields; and power headroom reports is shown in Table 6.

TABLE 6

| Multiple Entry power headroom MAC-CE | | | | | | | |
| --- | --- | --- | --- | --- | --- | --- | --- |
| $C_7$ | $C_6$ | $C_5$ | $C_4$ | $C_3$ | $C_2$ | $C_1$ | R |
| P | V | PH (Type 2, SpCell of the other MAC entity) | | | | | |
| MPE or R | | $P_{CMAX,f,c}$ 1 | | | | | |
| P | V | PH (Type 1, PCell) | | | | | |
| MPE or R | | $P_{CMAX,f,c}$ 2 | | | | | |

TABLE 6-continued

| Multiple Entry power headroom MAC-CE | | | | | | | |
| --- | --- | --- | --- | --- | --- | --- | --- |
| $C_7$ | $C_6$ | $C_5$ | $C_4$ | $C_3$ | $C_2$ | $C_1$ | R |
| P | V | PH (Type X, Serving Cell 1) | | | | | |
| MPE or R | | $P_{CMAX,f,c}$ 3 | | | | | |
| ... | ... | ... | | | | | |
| P | V | PH (Type X, Serving Cell n) | | | | | |
| MPE or R | | $P_{CMAX,f,c}$ m | | | | | |

In some aspects described herein, a UE 115 may support uplink carrier aggregation communications. For example, the UE 115 may be configured to communicate via multiple uplink component carriers. In such cases, the UE 115 may determine a total maximum output power for a given band combination, $P_{CMAX}$, and a maximum output power for a given serving cell, $P_{CMAX,c}$. The total maximum output power may correspond to a total power for transmissions across all of the component carriers supported by the UE 115 in a given frequency band combination. The total output power across component carriers may be set by the UE 115 within the following bounds: $P_{CMAX\_L} \leq P_{CMAX} \leq P_{CMAX\_H}$, where $P_{CMAX\_L}$ and $P_{CMAX\_H}$ may be defined based on one or more power parameters, such as a maximum transmission power configured by a network entity 105 for carrier aggregation communications by the UE 115 (e.g., $P_{EMAX,CA}$), a maximum power associated with a power class configured for carrier aggregation communications by the UE 115 (e.g., $P_{PowerClass,CA}$), a change or delta in the maximum power class (e.g., $\Delta P_{PowerClass,CA}$), an MPR parameter, one or more other parameters configured for the UE 115, or any combination thereof. The parameters used for determining the maximum output power may be different based on whether the UE 115 is configured to support intra-band contiguous carrier aggregation, intra-band non-contiguous carrier aggregation, or inter-band carrier aggregation.

In some systems, the UE 115 may report power headroom on a per-carrier basis, as described with reference to Tables 1-5 and Equation 2, and the UE 115 may not report the maximum output power across multiple component carriers. In such cases, a network entity 105 in communication with the UE 115 may not be aware of transmission power constraints at the UE 115. For example, a headroom (e.g., a remaining amount of power available for communications) to a maximum output power per carrier may be reported, but a headroom to a total maximum output power across carriers may not be reported by the UE 115.

Techniques, systems, and devices described herein provide for a UE 115 that supports uplink carrier aggregation to report an indication of the maximum output power across multiple component carriers determined by the UE 115. The UE 115 may determine the transmission power available for uplink carrier aggregation transmissions by the UE 115 across the multiple component carriers during a transmission occasion (e.g., the maximum transmission power level). The UE 115 may transmit a power headroom report via one or more component carriers of a set of component carriers configured for communications at the UE 115. The power headroom report may include a carrier aggregation power headroom parameter. A value of the carrier aggregation power headroom parameter may be based on the carrier aggregation transmission power available for uplink transmissions across the multiple component carriers and a second transmission power associated with uplink carrier aggregation transmissions via at least one of the component carriers during the transmission occasion. The UE 115 may thereby report a headroom to a total amount of power available for uplink component carrier aggregation communications, which may improve coordination between devices, throughput, and reliability of the uplink communications.

Figure 2:
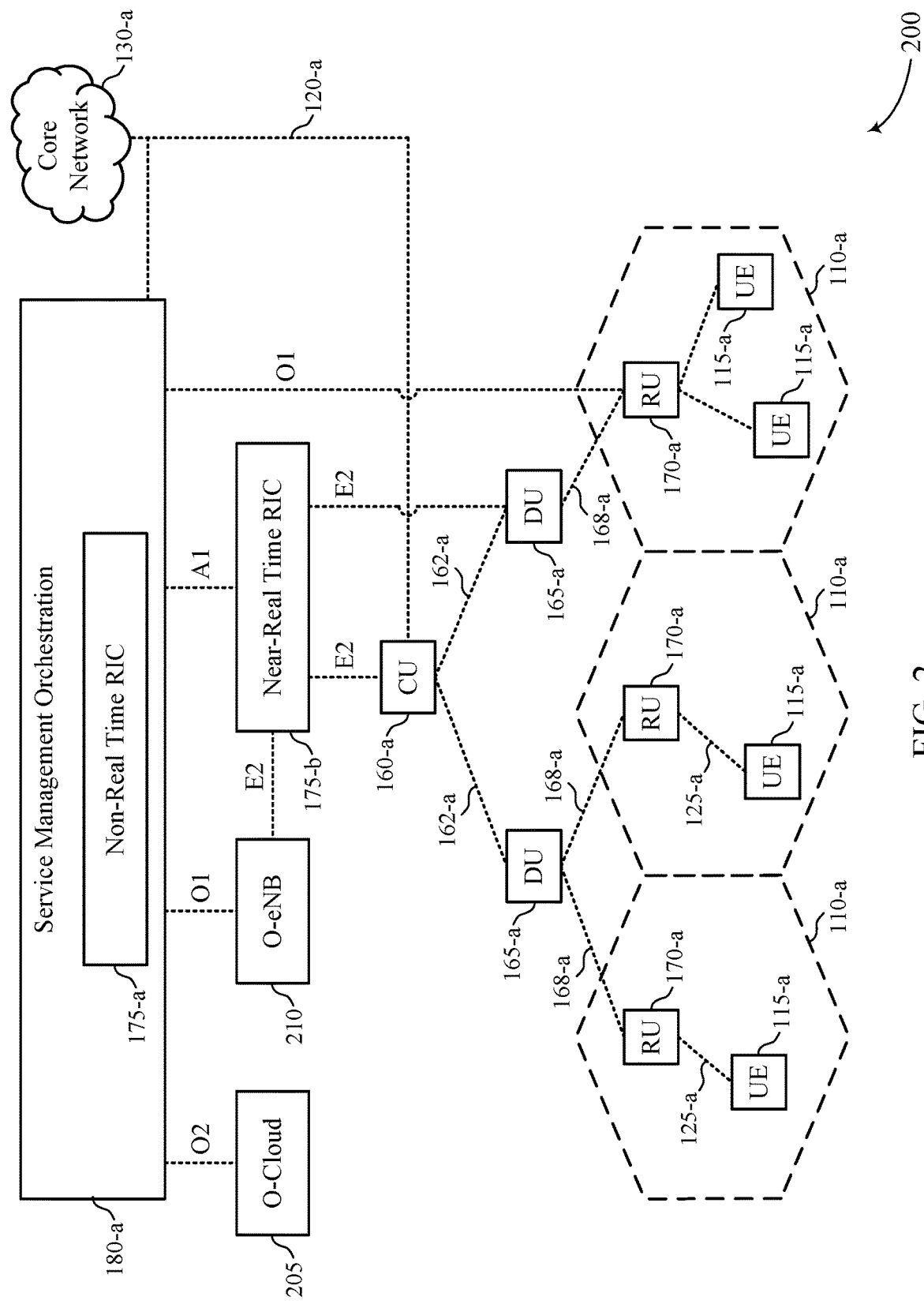
FIG. 2 illustrates an example of a network architecture that supports power headroom reporting for uplink carrier aggregation communications in accordance with one or more aspects of the present disclosure.

FIG. 2 illustrates an example of a network architecture 200 (e.g., a disaggregated base station architecture, a disaggregated RAN architecture) that supports power headroom reporting for uplink carrier aggregation communications in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The network architecture 200 may support techniques for carrier aggregation power headroom reporting by one or more communication devices (e.g., UEs 115). In some examples, a network entity (e.g., a CU 160-*a*, a DU 165-*a*, an RU 170-*a* or the like) may transmit a message (e.g., a control message) that indicates multiple component carriers configured for carrier aggregation communications at a UE 115. The network entity may, in some aspects, transmit a control message, such as an RRC message, that configures the UE 115 to support carrier aggregation power headroom reporting, that allocates uplink resources, or both. In some aspects, the network entity may allocate uplink resources for carrier aggregation power headroom reporting that are separate from other allocated uplink resources. Additionally, or alternatively, the network entity may allocate multiple sets of uplink resources and may monitor the allocated resources for any uplink transmissions from the UE 115, including a power headroom report. In some aspects, the network entity may indicate one or more timers or thresholds for triggering per-carrier power headroom reporting, multi-carrier power headroom reporting, or both. For example, the network entity may indicate a periodic timer, a prohibit timer, a pathloss threshold, a P-MPR threshold, or any combination thereof for the UE 115 to use to determine when to transmit a power headroom report.

The network entity may receive one or more uplink messages from the UE 115 over at least one of the component carriers. Additionally, or alternatively, the network entity may receive one or more power headroom reports from the UE 115 over at least one of the component carriers. The power headroom reports may include a carrier aggregation power headroom parameter, which may correspond to a field or set of bits in the power headroom report that is based in part on a transmission power available for uplink carrier aggregation communications by the UE 115 over the multiple component carriers. The network entity may schedule uplink resources for subsequent communications with the UE 115 based on the power headroom report and the carrier aggregation power headroom parameter. For example, the network entity may determine a quantity of uplink resources to allocate or a component carrier in which the resources are allocated based on the carrier aggregation power headroom information.

In some examples, the aforementioned operations of the network entity (e.g., a CU 160-*a*, a DU 165-*a*, an RU 170-*a*) may be performed in accordance with the network architecture 200. For example, higher layer parameters (e.g., RRC parameters) for per carrier power headroom reporting, carrier aggregation power headroom reporting, or both may be determined (e.g., selected, configured) by the CU 160-*a* and communicated to the DU 165-*a* (e.g., via a midhaul communication link 162-*a*). In some examples, the DU 165-*a* may generate one or more control messages according to the parameters communicated to the DU 165-*a* from the CU 160-*a* (e.g., via the higher layer parameters). For example, the DU 165-*a* may generate an RRC message that indicates a set of parameters configured for power headroom reporting. The DU 165-*a* may, in some aspects, transmit the message (e.g., OTA) to one or more other communication devices, such as a UE 115, or the DU 165-*a* may communicate the signal to the RU 170-*a*, for example via a fronthaul communication link 168-*a*. In some examples, and in response to obtaining the message generated by the DU 165-*a*, the RU 170-*a* may transmit the message (e.g., OTA) to one or more other communication devices (e.g., one or more UEs 115) via a communication link 125-*a*. The power headroom reports may be received by the RU 170-*a*, the DU 165-*a*, or both. The power headroom reporting information may be communicated to the DU 165-*a*, the CU 160-*a*, or both for processing. The DU 165-*a*, the CU 160-*a*, or both may perform resource allocation and scheduling procedures in accordance with the power headroom reporting information. Such techniques may lead to increased reliability of uplink wireless communications between one or more UEs 115 and the network.

Figure 3:
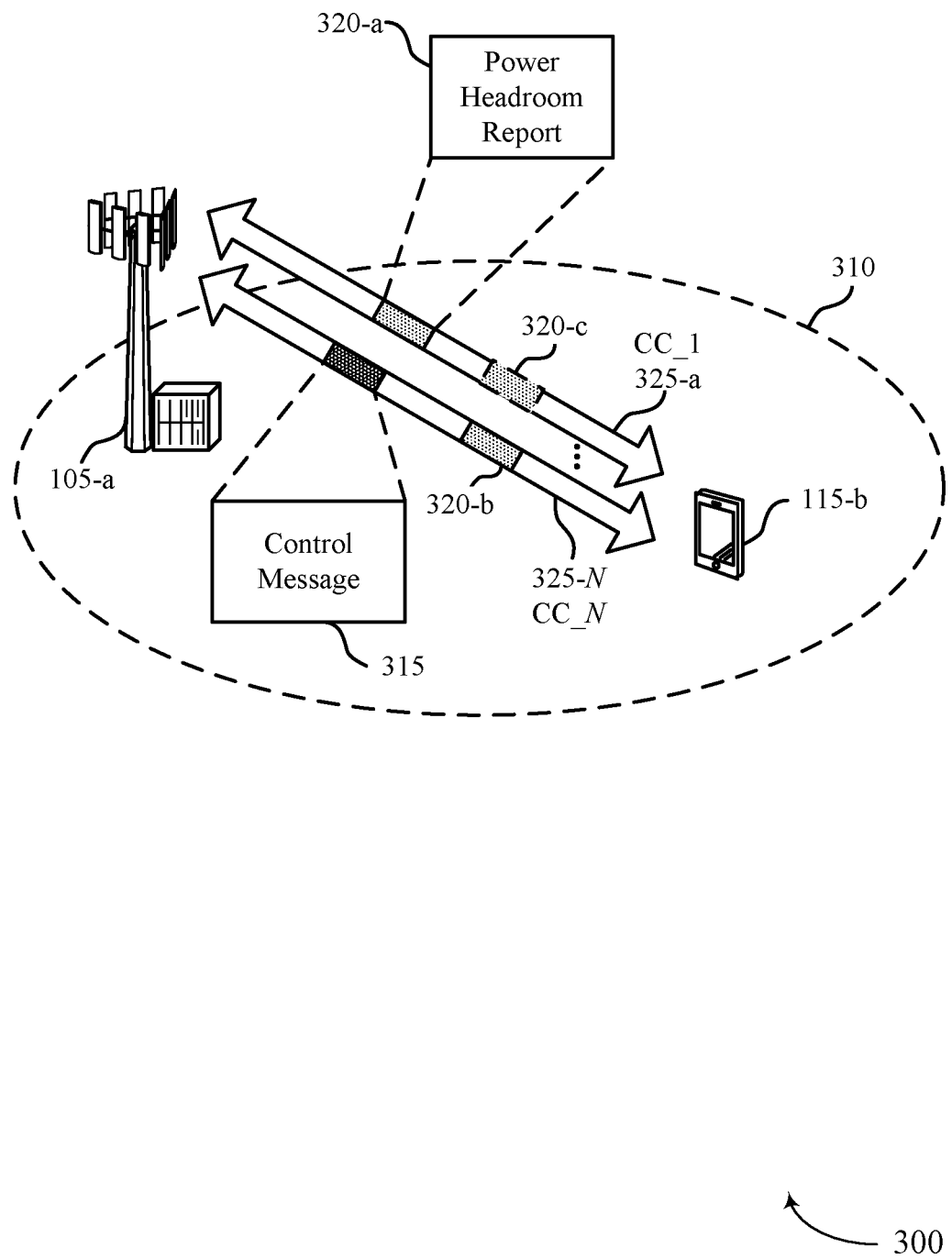
FIG. 3 illustrates an example of a wireless communications system that supports power headroom reporting for uplink carrier aggregation communications in accordance with one or more aspects of the present disclosure.

FIG. 3 illustrates an example of a wireless communications system 300 that supports power headroom reporting for uplink carrier aggregation communications in accordance with one or more aspects of the present disclosure. The wireless communications system 300 may implement or be implemented by aspects of the wireless communications system 100 or the network architecture 200 described with reference to FIGS. 1 and 2. For example, the wireless communications system 300 illustrates a network entity 105-*a* and a UE 115-*b*, which may represent examples of corresponding devices as described with reference to FIGS. 1 and 2. The network entity 105-*a* and the UE 115-*b* may support carrier aggregation communications. For example, the network entity 105-*a* and the UE 115-*b* may communicate with one another via one or more component carriers 325 and one or more corresponding cells 310.

The network entity 105-*a* may, in some aspects, transmit a control message 315 to the UE 115-*b* to indicate multiple component carriers 325 are configured for communications at the UE 115-*b* (e.g., uplink carrier aggregation communications). The control message 315 may indicate, configure, or activate the component carriers 325-*a* through 325-N illustrated in FIG. 3. Although a single cell 310 is illustrate in FIG. 3, it is to be understood that, in some aspects, each component carrier 325 may correspond to a respective serving cell 310 (e.g., a primary cell (PCell), a secondary cell (SCell), a primary secondary cell (PSCell) or other cell types). A coverage area of the serving cells 310 may differ for different component carriers 325 due to one or more parameters associated with the component carriers 325, such as pathloss.

As described with reference to FIG. 1, some systems may support per-carrier power headroom reporting. For example, a UE 115 may report a power headroom value that indicates a headroom or a difference between an amount or level of output power currently used by the UE 115 for transmissions via a given component carrier 325 and a total amount or level of output power that is available for transmissions by the UE 115 via the component carrier 325 (e.g., $P_{CMAX,f,c}$). However, in such cases, a network entity 105 in communication with the UE 115 may not know how much total transmission power is available at the UE 115 for carrier aggregation communications. Additionally, or alternatively, the network entity 105 may not know a relationship between the amount of power available for transmissions via a given component carrier (e.g., $P_{CMAX,f,c}$) and the total amount of power available across all component carriers (e.g., $P_{CMAX}$).

Techniques, systems, and devices described herein support power headroom reporting for carrier aggregation communications. For example, the UE 115-b may transmit one or more carrier aggregation power headroom reports 320 that indicate an amount of transmission power available for communications by the UE 115-b across the multiple component carriers 325-a through 325-N that are configured for carrier aggregation communications at the UE 115-b. In some aspects, the amount of transmission power may be referred to as a maximum output power for carrier aggregation or a carrier aggregation transmit power level herein (e.g., $P_{CMAX}$). The UE 115-b may determine the carrier aggregation transmit power level based on an upper and lower bound, which may be based on one or more parameters, as described with reference to FIG. 1. As such, the network entity 105-a may not know the carrier aggregation transmit power level for the UE 115-b before the network entity 105-a receives the carrier aggregation power headroom report 320.

The carrier aggregation power headroom report 320 may include one or more fields or parameters configured to indicate a headroom or gap to the carrier aggregation transmit power level across all the component carriers 325 (e.g., a gap to $P_{CMAX}$), to indicate the carrier aggregation transmit power level across all the component carriers 325, or both. In some aspects, the carrier aggregation transmit power level may correspond to a given transmission occasion (e.g., a slot, one or more symbols, or some other time period for transmission by the UE 115-b). For example, the carrier aggregation transmit power level may be a maximum amount of power the UE 115-b may use for transmissions across the component carriers 325-a through 325-N during a given transmission occasion. In some aspects, the carrier aggregation transmit power level may be associated with a frequency band combination, or may be associated with a given cell and multiple component carriers 325 (e.g., $P_{CMAX, c}$).

The UE 115-b may combine the carrier aggregation power headroom reporting with per-carrier power headroom reporting, or the UE 115-b may perform the carrier aggregation power headroom reporting separately. In some aspects, the UE 115-b may transmit a power headroom report 320 via each component carrier 325 over which the UE 115-a transmits. For example, if the UE 115-b transmits at least one uplink message via the component carrier 325-a and the component carrier 325-N, the UE 115-b may transmit the power headroom report 320-a to indicate a power headroom for the component carrier 325-a and the power headroom report 320-b to indicate a power headroom for the component carrier 325-N. In some aspects described herein, the per-carrier power headroom reports 320 may include one or more fields for carrier aggregation power headroom reporting. As such, the UE 115-b may transmit, via each power headroom report 320, per-carrier power headroom information and multi-carrier power headroom information.

The multi-carrier power headroom information may be an indication of the carrier aggregation transmit power level available across the multiple component carriers 325 (e.g., the UE 115-b may report the value of $P_{CMAX}(i)$, where i may correspond to a transmission occasion). Additionally, or alternatively, the multi-carrier power headroom information may be a difference between the carrier aggregation transmit power level and a second transmission power associated with transmissions by the UE 115-b via a respective component carrier 325.

With reference to FIG. 3, the UE 115-b may transmit one or more uplink messages to the network entity 105-a via the component carrier 325-a and the component carrier 325-N (e.g., and one or more other component carriers 325). The UE 115-b may transmit, via the power headroom report 320-a on the component carrier 325-a, a difference between the carrier aggregation transmit power level (e.g., PCMAX (i)) and a second transmit power level associated with the one or more uplink messages transmitted via the component carrier 325-a during a transmission occasion. The power headroom report 320-a may, in some aspects, additionally include per-carrier headroom information, such as a difference between an amount of transmit power available for transmissions by the UE 115-b via the component carrier 325-a and the cell 310 (e.g., $P_{CMAX,f,c}$) and the second transmit power.

The UE 115-b may similarly transmit, via the power headroom report 320-b on the component carrier 325-N, a difference between the carrier aggregation transmit power level and a third transmit power level associated with the transmissions on the component carrier 325-N in the transmission occasion, as well as a difference between the available transmit power on the component carrier 325-N and the cell 310 and the third transmit power. Example configurations for power headroom reports 320 that support indicating multi-carrier power headroom information and per-carrier power headroom information are described in further detail elsewhere herein, including with reference to FIG. 4.

In some other aspects, the UE 115-b may transmit a carrier aggregation power headroom report 320 separately from (e.g., in addition to or instead of) one or more per-carrier power headroom reports 320. With reference to FIG. 3, for example, the UE 115-b may transmit the power headroom report 320-b via the component carrier 325-N to indicate per-carrier power headroom information associated with the component carrier 325-N (e.g., a gap to $P_{CMAX,f,c}$ for CC_N), and the UE 115-b may transmit the power headroom report 320-c via the component carrier 325-a to indicate per-carrier power headroom information associated with the component carrier 325-a (e.g., a gap to $P_{CMAX,f,c}$ for CC_1). The UE 115-b may additionally transmit a separate carrier aggregation power headroom report 320-a via the component carrier 325-a to indicate the multi-carrier power headroom information. For example, the carrier aggregation power headroom report 320-a may include one or more fields to indicate the carrier aggregation transmit power level determined by the UE 115-b or to indicate a difference between the carrier aggregation transmit power level and a sum of second transmit power levels used by the UE 115-b for uplink transmissions across the multiple component carriers 325-a through 325-N, or both. Example configurations for power headroom reports 320 that support indicating multi-carrier power headroom information are described in further detail elsewhere herein, including with reference to FIG. 5.

The network entity 105-a may indicate one or more timers for the UE 115-b to use for uplink power headroom reporting, as described with reference to FIG. 1. For example, the network entity 105-a may transmit a power headroom reporting configuration that indicates a periodic timer, a prohibit timer, or both for power headroom reporting. In some aspects described herein, the timers may be configured for per-carrier power headroom reporting (e.g., configured per cell group), and the UE 115-b may reuse the configured timers for carrier aggregation power headroom reporting. For example, the UE 115-b may start the prohibit timer after transmission of a power headroom report 320 (e.g., a per-carrier report or a carrier aggregation report), and the UE 115-*b* may refrain from transmitting the carrier aggregation power headroom report 320 until the prohibit timer expires. Additionally, or alternatively, the UE 115-*b* may transmit a carrier aggregation power headroom report 320 periodically in accordance with the periodic timer.

In some other aspects, the network entity 105-*a* may indicate a first prohibit timer, a first periodic timer, or both for per-carrier power headroom reporting, and the network entity 105-*a* may indicate a second prohibit timer, a second periodic timer, or both for carrier aggregation power headroom reporting (e.g., the network entity 105-*a* may set a dedicated periodicity for uplink carrier aggregation power headroom reporting). If the network entity 105-*a* configures a carrier aggregation prohibit timer, the UE 115-*b* may refrain from transmitting a second carrier aggregation power headroom report 320 until an expiration of the prohibit timer, which may start after transmission of a first carrier aggregation power headroom report 320. Additionally, or alternatively, if the network entity 105-*a* configures a carrier aggregation periodicity or periodic timer, the UE 115-*b* may transmit a carrier aggregation power headroom report 320 periodically in accordance with the configured carrier aggregation periodicity. The UE 115-*b* may transmit per-carrier power headroom reports 320 in accordance with a configured per-carrier periodic timer, per-carrier prohibit timer, or both.

The UE 115-*b* may transmit the power headroom reports 320 via granted uplink resources in each respective component carrier 325. In some aspects, the UE 115-*b* may receive an uplink grant (e.g., a PUSCH grant) for power headroom reporting from the network entity 105-*a*. The UE 115-*b* may transmit the power headroom report 320 via the resources indicated via the uplink grant. In some other aspects, the network entity 105-*a* may transmit an uplink grant that grants resources for the UE 115-*b* to use for an uplink transmission. The UE 115-*b* may transmit the power headroom report 320 via the resources granted for the uplink transmissions. For example, the UE 115-*b* may append the bits of the power headroom report 320 to the data bits of the uplink transmission.

The network entity 105-*a* may, in some aspects, assign or allocate a set of uplink resources (e.g., PUSCH resources) for transmission of uplink carrier aggregation power headroom reporting by the UE 115-*b*. The allocated resources may be different from (e.g., non-overlapping or partially overlapping with) resources allocated for per-carrier power headroom reporting by the UE 115-*b*. Additionally, or alternatively, the UE 115-*b* may determine that at least one of the component carriers 325 or corresponding cells 310 is configured for uplink carrier aggregation reporting, and the UE 115-*b* may transmit the uplink carrier aggregation power headroom report 320 via the at least one component carrier 325 and corresponding cell 310 (e.g., in addition to or instead of a per-carrier power headroom report 320 on the at least one component carrier 325). The UE 115-*b* may receive control signaling or some other indication from the network entity 105-*a* that indicates the component carrier 325, a cell 310, or both that are configured for carrier aggregation power headroom reporting (e.g., a PCell, or some other cell 310).

In some other aspects, the UE 115-*b* may transmit the carrier aggregation power headroom report 320 via a first set of uplink resources allocated for power headroom reporting that are available at an earliest time after an expiration of the periodic timer, the prohibit timer, or both. For example, the network entity 105-*a* may grant multiple sets of uplink resources to the UE 115-*b*. The UE 115-*b* may identify one of the multiple granted sets of uplink resources that occurs earliest in time, and the UE 115-*b* may transmit the carrier aggregation power headroom report 320 via the identified set of resources, which may be within a certain component carrier 325. In some aspects, the UE 115-*b* may append the uplink carrier aggregation power headroom report 320 to the uplink transmission in the identified set of resources, or the UE 115-*b* may transmit the carrier aggregation power headroom report 320 and a per-carrier power headroom report 320 via the same set of uplink resources, or both.

The UE 115-*b* may thereby transmit an uplink carrier aggregation power headroom report 320 via granted uplink resources after expiration of a prohibit timer, a periodic timer, or both. In some other aspects, the UE 115-*b* may transmit the uplink carrier aggregation power headroom report 320 based on a change in pathloss, a change in P-MPR, or both of one or more carriers 325. For example, the UE 115-*b* may measure a pathloss associated with one or more of the component carriers 325. If the UE 115-*b* detects that a change in pathloss of at least one of the component carriers 325 (e.g., or a subset of the component carriers 325, or all of the component carriers 325) exceeds a threshold, the UE 115-*b* may be triggered to transmit a carrier aggregation power headroom report 320. Additionally, or alternatively, the UE 115-*b* may monitor a P-MPR associated with one or more of the component carriers 325. If the UE 115-*b* detects that a change in the P-MPR of at least one of the component carriers 325 (e.g., or a subset of the component carriers 325, or all of the component carriers 325) exceeds a threshold, the UE 115-*b* may be triggered to transmit a carrier aggregation power headroom report 320.

The network entity 105-*a* may transmit control signaling (e.g., an RRC message or some other signaling) that indicates the thresholds for triggering carrier aggregation power headroom reporting. In some aspects, the thresholds may be indicated via a power headroom reporting configuration transmitted to the UE 115-*b*. The thresholds may be configured for per-carrier power headroom reporting and carrier aggregation power headroom reporting, in some aspects. Additionally, or alternatively, the network entity 105-*a* may indicate separate thresholds for carrier aggregation power headroom reporting.

The UE 115-*b* described herein may thereby report power headroom on a per-carrier basis and a multi-carrier basis for uplink carrier aggregation communications. By indicating a headroom or gap to a maximum transmission power available across all of the component carriers 325 configured for the UE 115-*b*, the UE 115-*b* may improve coordination between the UE 115-*b* and the network entity 105-*a*, which may improve throughput and reliability of communications.

Figure 4:
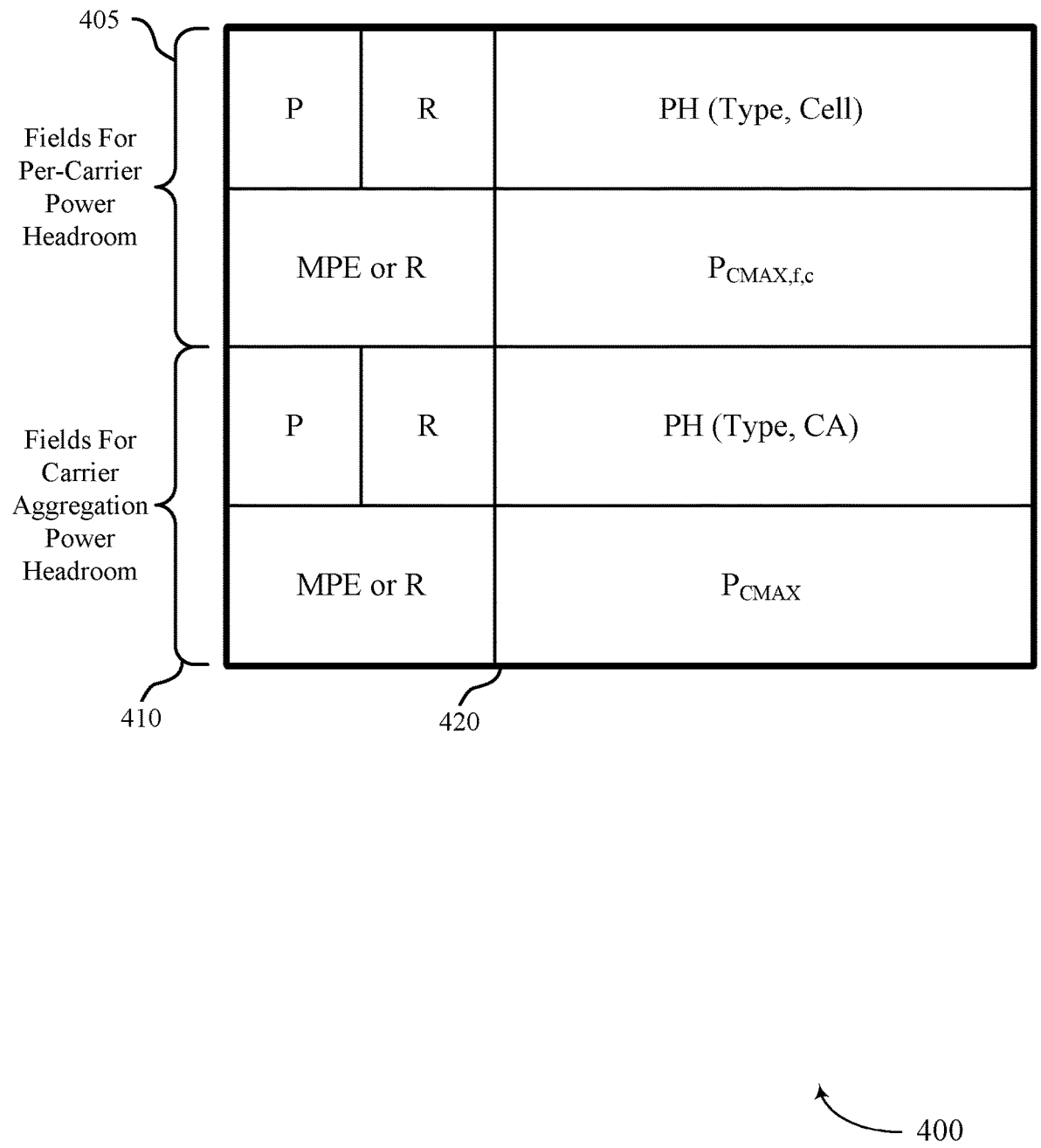
FIG. 4 illustrates an example of a power headroom report configuration that supports power headroom reporting for uplink carrier aggregation communications in accordance with one or more aspects of the present disclosure.

FIG. 4 illustrates an example of a power headroom report configuration 400 that supports power headroom reporting for uplink carrier aggregation communications in accordance with one or more aspects of the present disclosure. The power headroom report configuration 400 may implement or be implemented by aspects of the wireless communications systems 100 and 300 or the network architecture 200 described with reference to FIGS. 1-3. For example, the power headroom report configuration 400 illustrates an example format or configuration of a power headroom report 420, which may represent an example of a power headroom report 320 described with reference to FIG. 3. The power headroom report 420 may be transmitted by a UE 115 to a network entity 105, which may represent examples of corresponding devices as described with reference to FIGS. 1-3. In this example, the power headroom report 420 may be configured to convey per-carrier power headroom information and multi-carrier power headroom information.

As described with reference to FIGS. 1-3, a UE 115 may transmit a power headroom report 420 via one or more component carriers over which the UE 115 communicates. The power headroom report 420 may be transmitted via a MAC-CE (e.g., a configuration of PUSCH bits within a control element), or some other signaling. The power headroom report 420 may include a first set of fields 405 for indicating per-carrier power headroom information, such as the P field, the R field, the MPE field, the power headroom field, and the $P_{CMAX,f,c}$ field. Such fields are described in further detail elsewhere herein, including with reference to FIG. 1 and Tables 1-5.

As described herein, a per-carrier power headroom report 420 may be augmented to include a second set of fields 410 for carrier aggregation power headroom reporting. For example, the second set of fields 410 may include a P field, an R (e.g., reserved) field, an MPE or R field, a power headroom field, a $P_{CMAX}$ field, or any combination thereof for multiple carriers associated with the uplink carrier aggregation communications. As such, the per-carrier power headroom report 420 may indicate a carrier aggregation power headroom parameter, which may be based on the carrier aggregation transmit power level $P_{CMAX}$, in addition to indicating headroom based on a per-carrier transmit power level $P_{CMAX,f,c}$.

In some aspects, a carrier aggregation power headroom field in the power headroom report 420 (e.g., PH (Type, CA)) may indicate the carrier aggregation power headroom parameter. The value in the power headroom field may be based on the carrier aggregation transmit power level, based on a second transmit power level associated with uplink transmissions via at least one component carrier, or both.

For example, the carrier aggregation power headroom field may indicate a difference between the carrier aggregation transmit power level and a second transmit power level associated with uplink transmissions by the UE 115 on a respective component carrier via which the power headroom report 420 is being transmitted. The UE 115 may determine the transmit power level for transmitting an uplink transmission on a given component carrier based on Equation 1, as described with reference to FIG. 1. Accordingly, the power headroom field may indicate a difference between the carrier aggregation transmit power level determined by the UE 115 and the transmit power level for the given component carrier, in accordance with Equation 3.

$$PH_{type,X,b,f,c}(i,j,q_d,l)=P_{CMAX}(i)-P_{PUSCH,b,f,c}(i,j,q_d,l) \quad \text{Equation (3)}$$

In the example of Equation 3, j may correspond to a parameter set index, l may correspond to a PUSCH power control adjustment state index, and i may correspond to a transmission occasion index. $P_{PUSCH,b,f,c}$(i, j, $q_d$, l) may be determined based on Equation 1 described with reference to FIG. 1. In some aspects, a type of power headroom reporting may be defined for uplink carrier aggregation (e.g., $PH_{typeX}$), and the UE 115 may indicate the type via the power headroom field.

Additionally, or alternatively, the power headroom field may indicate a difference between the carrier aggregation transmit power level and a maximum transmit power available for transmissions via a component carrier associated with the power headroom report 420, in accordance with Equation 4.

$$PH_{type,X,b,f,c}(i,j,q_d,l)=P_{CMAX}(i)-P_{CMAX,f,c}(i) \quad \text{Equation (4)}$$

In some other aspects, the power headroom field may indicate the carrier aggregation transmit power level for a given transmission occasion (e.g., $P_{CMAX}$(i)). Additionally, or alternatively, a $P_{CMAX}$ field in the power headroom report 420 may indicate the carrier aggregation transmit power level for a given transmission occasion.

In some aspects, the power headroom report 420 may include a first MPE field for per-carrier MPE reporting and a second MPE field for indicating carrier aggregation MPE. The UE 115 may indicate, via the carrier aggregation MPE field, an amount of power backoff that may be applied by the UE 115 to satisfy (e.g., remain below) the maximum transmit power level across component carriers (e.g., $P_{CMAX}$(i)). In such cases, the per-carrier MPE field may indicate an amount of backoff applied per carrier, and the carrier aggregation MPE field may indicate a summation of the per-carrier power backoff levels.

Although five fields are included in the second set of fields 410 illustrated in FIG. 4, it is to be understood that a quantity of fields in the second set of fields 410 for carrier aggregation power headroom reporting and a format of the fields may vary. For example, the second set of fields 410 may not include one or more of the fields illustrated, or may include additional fields not illustrated in the example of FIG. 4. Additionally, or alternatively, the fields may include any quantity of bits. In some aspects, the second set of fields 410 may include the carrier aggregation MPE field and the $P_{CMAX}$ field, but may not include the P, R, or power headroom fields. Additionally, or alternatively, the second set of fields 410 may include the $P_{CMAX}$ and power headroom fields, or may include one of the fields, or any other combination of fields.

The UE 115 may transmit the per-carrier power headroom report 420 via a set of uplink resources on a respective component carrier. The set of uplink resources may be indicated via an uplink grant transmitted by a network entity 105. The UE 115 may transmit a respective per-carrier power headroom report 420 via each component carrier that the UE 115 uses for uplink transmissions. Accordingly, each per-carrier power headroom report 420 may indicate carrier aggregation power headroom information. The UE 115 may be configured with a periodic timer, a prohibit timer, or both for reporting power headroom, as described with reference to FIG. 2. Additionally, or alternatively, the UE 115 may transmit a per-carrier power headroom report 420 based on a measured pathloss associated with one or more component carriers exceeding a threshold, a measured P-MPR associated with one or more component carriers exceeding a threshold, or both.

A UE 115 as described herein may thereby transmit a per-carrier power headroom report 420 via a single uplink message (e.g., set of bits) to indicate a first amount of power the UE 115 is capable of using to transmit uplink messages across multiple component carriers within a transmission occasion and a second amount of power the UE 115 is capable of using to transmit uplink messages via a single component carrier within the transmission occasion. The per-carrier power headroom report 420 may indicate the first amount of power via a carrier aggregation power headroom parameter. The UE 115 may indicate the first and second amounts of power directly, or the UE 115 may report a respective a gap or headroom to the first and second amounts of power from an amount of power currently used per carrier, or both.

Figure 5:
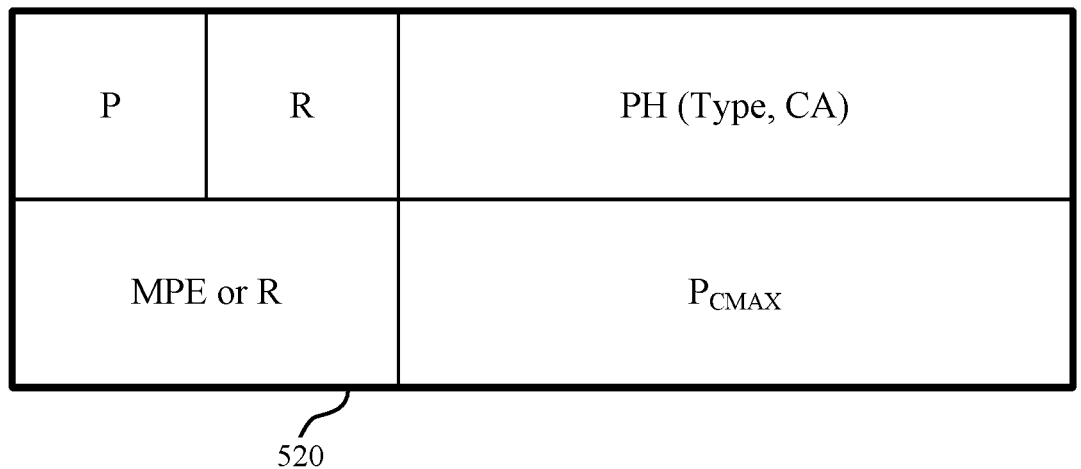
FIG. 5 illustrates an example of a power headroom report configuration that supports power headroom reporting for uplink carrier aggregation communications in accordance with one or more aspects of the present disclosure.

FIG. 5 illustrates an example of a power headroom report configuration 500 that supports power headroom reporting for uplink carrier aggregation communications in accordance with one or more aspects of the present disclosure. The power headroom report configuration 500 may implement or be implemented by aspects of the wireless communications systems 100 and 300 or the network architecture 200 described with reference to FIGS. 1-3. For example, the power headroom report configuration 500 illustrates an example format or configuration of a power headroom report 520, which may represent an example of a power headroom report 320 described with reference to FIG. 3. The power headroom report 520 may be transmitted by a UE 115 to a network entity 105, which may represent examples of corresponding devices as described with reference to FIGS. 1-4. In this example, the power headroom report 520 may be a carrier aggregation power headroom report 520 configured to convey multi-carrier power headroom information.

As described with reference to FIGS. 1-4, a UE 115 may transmit a per-carrier power headroom report via one or more component carriers over which the UE 115 communicates. The power headroom reports may be transmitted via a MAC-CE (e.g., a configuration of PUSCH bits within a control element), or some other signaling.

As described herein, a carrier aggregation power headroom report 520 may be defined or configured for a UE 115 to use to report multi-carrier power headroom information. A structure or format of the carrier aggregation power headroom report 520 may be similar to the format of the per-carrier power headroom reports described with reference to FIGS. 1-4. For example, the carrier aggregation power headroom report 520 may include multiple fields, such as a P field, a reserved (e.g., R) field, an MPE field, a carrier aggregation power headroom field, and a $P_{CMAX}$ field. The carrier aggregation power headroom report 520 may be configured to indicate a carrier aggregation power headroom parameter.

The UE 115 may transmit the carrier aggregation power headroom report 520 in addition to one or more per-carrier power headroom reports to separately report power headroom to the carrier aggregation transmit power level (e.g., $P_{CMAX}(i)$). The carrier aggregation power headroom report 520 may not be associated with a particular carrier. Instead, the carrier aggregation power headroom report 520 may be associated with multiple carriers (e.g., all component carriers supported by the UE 115, or a subset of the component carriers).

The UE 115 may indicate the carrier aggregation power headroom parameter via the $P_{CMAX}$ field, the power headroom field, or both. For example, the UE 115 may indicate a value of the carrier aggregation transmit power level, $P_{CMAX}$, via the $P_{CMAX}$ field. The UE 115 may indicate a headroom to the carrier aggregation transmit power level via the power headroom field. In some aspects, the headroom to the carrier aggregation transmit power level may be based on a sum of transmission powers used by the UE 115 for transmissions across multiple component carriers. The UE 115 may determine a transmission power for transmitting a given uplink message via a respective component carrier during a transmission occasion according to Equation 5, which may represent an example of Equation 1 described with reference to FIG. 1.

$$P_{tx,b,f,c}(i, j, q_d, l) = \text{Equation (5)}$$
$$P_{O_{PUSCH},b,f,c}(j) + 10\log_{10}\left(2^{\mu} M_{RB,b,f,c}^{PUSCH}(i)\right) +$$
$$\alpha_{b,f,c}(j)PL_{b,f,c}(q_d) + \Delta_{TF,b,f,c}(i) + f_{b,f,c}(i, l)$$

The UE 115 may calculate a sum of all transmission powers the UE 115 has used to transmit uplink messages via the multiple component carriers within a given time period or transmission occasion, i. The UE 115 may calculate a difference between the carrier aggregation transmit power level and the sum of the transmission powers according to Equation 6.

$$PH_{type,X,b,f,c}(i,j,q_d,l)=P_{CMAX}(i)-\Sigma P_{tx,b,f,c}(i,j,q_d,l) \quad \text{Equation (6)}$$

The UE 115 may indicate the determined value of $PH_{type,x,b,f,c}(i,j,q_d,l)$ via the power headroom field in the carrier aggregation power headroom report 520. In some aspects, the UE 115 may not transmit an uplink message via each component carrier at the same time or within a same transmission occasion. In such cases, the UE 115 may represent a transmission power level for those carriers during the transmission occasion as a null value (e.g., zero) in the summation shown in Equation 6. Additionally, or alternatively, the UE 115 may utilize one or more reference power levels for the subset of component carriers via which the UE 115 does not transmit an uplink message.

The reference power levels (e.g., reference PUSCH) may be used for all uplink component carriers that do not include an uplink transmission in a given transmission occasion except the uplink component carrier that carries the carrier aggregation power headroom report 520. The UE 115 may compute a transmission power level per component carrier based on a value of $P_{CMAX,f,c}$, which may be based on an MPR level and a P-MPR level, as described with reference to FIG. 1. Accordingly, if the UE 115 does not transmit via a component carrier, the UE 115 may compute a reference power level for the component carrier by setting one or more parameters, such as the P-MPR and the MPR parameters, to zero (e.g., zero decibels) and computing the reference power level accordingly. The UE 115 may utilize the reference power levels in the summation of transmit power levels across carriers when determining the carrier aggregation power headroom. For example, some of the values of $P_{tx,b,f,c}(i, j, q_d, l)$ in Equation 6 may be reference power levels, in some aspects.

The carrier aggregation power headroom report 520 may include a P field and an MPE field, in some aspects. The P field and the MPE field may be similar to corresponding fields as described with reference to FIG. 1, and may be configured for carrier aggregation MPE reporting. For example, the P field may indicate whether carrier aggregation MPE information is being reported by the UE 115. If the P field is set to one and carrier aggregation MPE reporting is configured via the power headroom reporting configuration for the UE 115, the UE 115 may indicate, via an MPE field in the carrier aggregation power headroom report 520, an applied power backoff (e.g., P-MPR level) to satisfy (e.g., remain below) the carrier aggregation transmit power level (e.g., $P_{CMAX}(i)$) across the multiple component carriers. The applied power backoff may correspond to a sum of power backoffs applied per carrier, in some aspects.

If the P field is not set to one, if the carrier aggregation MPE reporting is not configured in the power headroom reporting configuration, if the UE 115 operates in a frequency band that does not support MPE reporting (e.g., Frequency Range 1 (FR1)), or any combination thereof, the MPE field may be a reserved field, which may be empty or null (e.g., R bits may be present).

The UE 115 may transmit the carrier aggregation power headroom report 520 via a first component carrier. The UE 115 may determine which component carrier to use for transmitting the carrier aggregation power headroom report 520 based on a defined rule or a configuration indicated via control signaling. Additionally, or alternatively, the UE 115 may select a component carrier that includes a set of resources granted for carrier aggregation power headroom reporting. In some other aspects, the UE 115 may select a set of granted uplink resources that are available before other sets of granted uplink resources in time, and the UE 115 may transmit the carrier aggregation power headroom report 520 via the component carrier that includes the selected set of resources, as described with reference to FIG. 2

Although five fields are illustrated in FIG. 5, it is to be understood that a quantity of fields in the carrier aggregation power headroom report 520 and a format of the fields may vary. For example, the carrier aggregation power headroom report 520 may not include one or more of the fields illustrated, or may include additional fields not illustrated in the example of FIG. 5. Each of the fields may include any quantity of bits for conveying the corresponding information.

A UE 115 as described herein may thereby transmit the carrier aggregation power headroom report 520 via an uplink message (e.g., set of bits) to indicate an amount of power the UE 115 is capable of using to transmit uplink messages across multiple component carriers within a transmission occasion. The UE 115 may transmit other uplink messages (e.g., per-carrier power headroom reports) to indicate available power per component carrier. By transmitting an indication of the carrier aggregation power headroom, the UE 115 may improve throughput and reliability of communications with a network entity 105.

Figure 6:
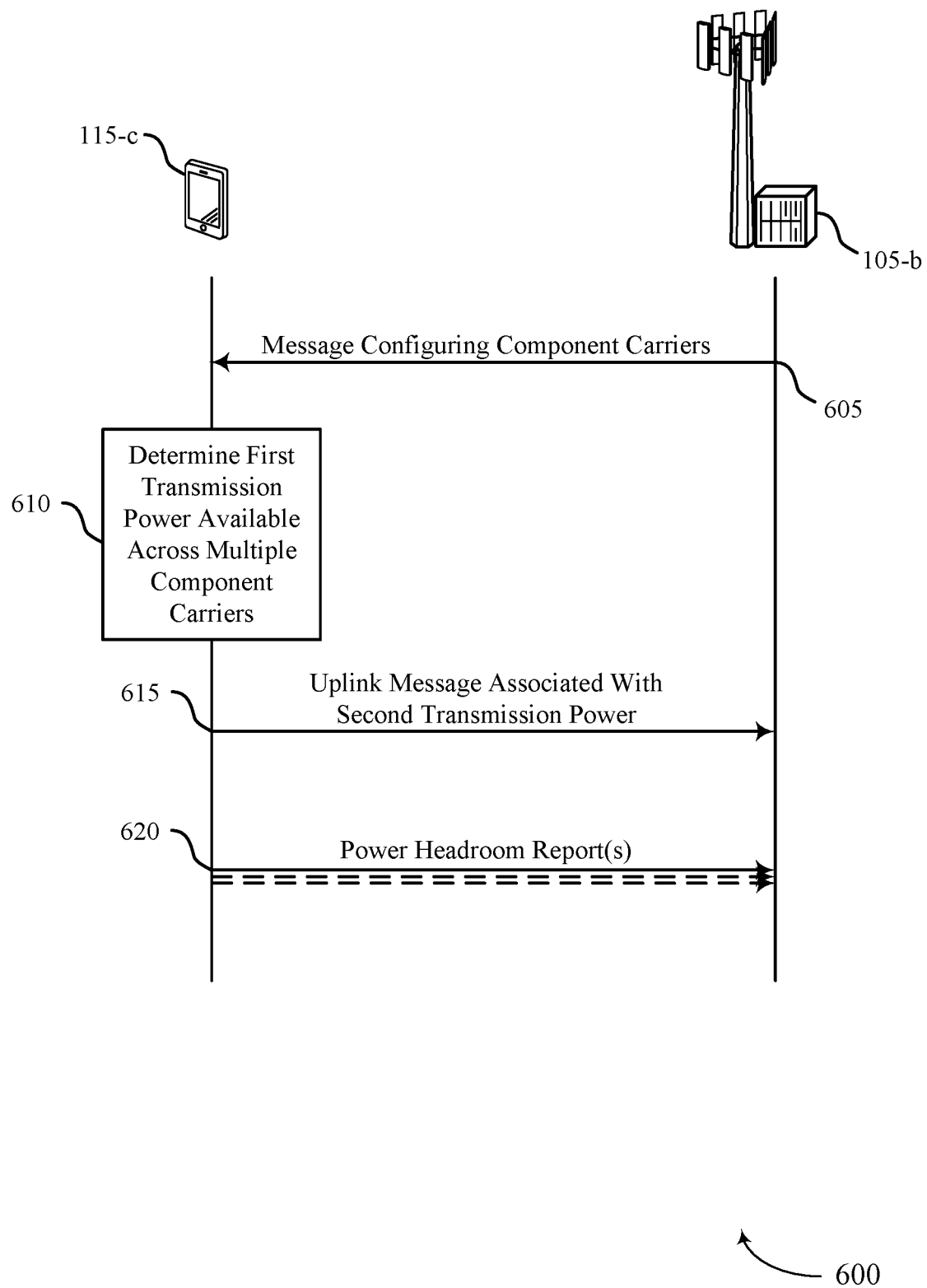
FIG. 6 illustrates an example of a process flow that supports power headroom reporting for uplink carrier aggregation communications in accordance with one or more aspects of the present disclosure.

FIG. 6 illustrates an example of a process flow 600 that supports power headroom reporting for uplink carrier aggregation communications in accordance with one or more aspects of the present disclosure. The process flow 600 may implement or be implemented by aspects of the wireless communications systems 100 and 300, the network architecture 200, or the power headroom report configurations 400 and 500 described with reference to FIGS. 1-5. For example, the process flow 600 illustrates communications between a UE 115-c and a network entity 105-b, which may represent examples of corresponding devices as described with reference to FIGS. 1-5. In some aspects, the UE 115-c may report power headroom for uplink carrier aggregation communications.

In the following description of the process flow 600, the operations between the UE 115-c and the network entity 105-b may be performed in different orders or at different times. Some operations may also be left out of the process flow 600, or other operations may be added. Although the UE 115-c and the network entity 105-b are shown performing the operations of the process flow 600, some aspects of some operations may also be performed by one or more other wireless devices.

At 605, the network entity 105-b may transmit a first message to the UE 115-c. The first message may indicate multiple component carriers are configured for communications at the UE 115-c (e.g., uplink carrier aggregation communications). The first message may, in some aspects, be a control message. In some aspects, the network entity 105-b may transmit, to the UE 115-c, a control message (e.g., an RRC configuration) that indicates a power headroom reporting configuration. The power headroom reporting configuration may include one or more parameters for power headroom reporting on a per-carrier and a multi-carrier basis, as described with reference to FIGS. 1-5.

At 610, the UE 115-c may determine a first transmission power available for uplink carrier aggregation transmissions by the UE 115-c across the multiple component carriers during a transmission occasion. The UE 115-c may determine the first transmission power, which may be referred to as a maximum output power for carrier aggregation communications in some aspects herein (e.g., $P_{CMAX}$), based on one or more configured parameters or boundaries, as described with reference to FIGS. 1 and 3-5.

At 615, in some aspects, the UE 115-c may transmit at least one uplink message associated with a second transmission power during the transmission occasion. For example, the UE 115-c may use the second transmission power to transmit the at least one uplink message. The UE 115-c may transmit the uplink message to the network entity 105-b via a first component carrier of the multiple component carriers. In some aspects, the UE 115-c may transmit multiple uplink messages each via a respective component carrier of the multiple component carriers and each associated with a respective second transmission power.

At 620, the UE 115-c may transmit a power headroom report to the network entity 105-b. The UE 115-c may transmit the power headroom report via at least a first component carrier of the multiple component carriers configured for communications at the UE 115-c. The power headroom report may include a carrier aggregation power headroom parameter. A value of the carrier aggregation power headroom parameter may be based on the first transmission power available across the multiple component carriers (e.g., $P_{CMAX}$) and a second transmission power associated with the uplink carrier aggregation transmissions via at least one of the multiple component carriers during the transmission occasion (e.g., the uplink message).

In some aspects, the carrier aggregation power headroom parameter may indicate a difference between the first transmission power and the second transmission power. In some aspects, the second transmission power may correspond to an amount of power available for uplink transmissions via the first component carrier (e.g., $P_{CMAX,f,c}$). Additionally, or alternatively, the carrier aggregation power headroom parameter may indicate a difference between the first transmission power and a sum of multiple second transmission powers associated with uplink transmissions via more than one of the multiple component carriers. In some other aspects, the carrier aggregation power headroom parameter may indicate the first transmission power. The carrier aggregation power headroom parameter may correspond to a field or a quantity of one or more bits in a power headroom report that indicates carrier aggregation power headroom information.

In some aspects, the power headroom report may include per-carrier power headroom information, as described with reference to FIG. 4. For example, a second power headroom parameter in the power headroom report may indicate a difference between a transmission power available for transmissions on a first component carrier and the second transmission power. Additionally, or alternatively, the UE 115-c may transmit one or more other per-carrier power headroom reports on one or more component carriers to indicate the per-carrier power headroom information, as described with reference to FIG. 5.

The UE 115-c may thereby report power headroom across multiple component carriers to the network entity 105-b. The network entity 105-b may utilize the reported carrier aggregation power headroom to schedule or perform wireless communications with the UE 115-c, which may improve coordination between devices and communication reliability, among other advantages.

Figure 7:
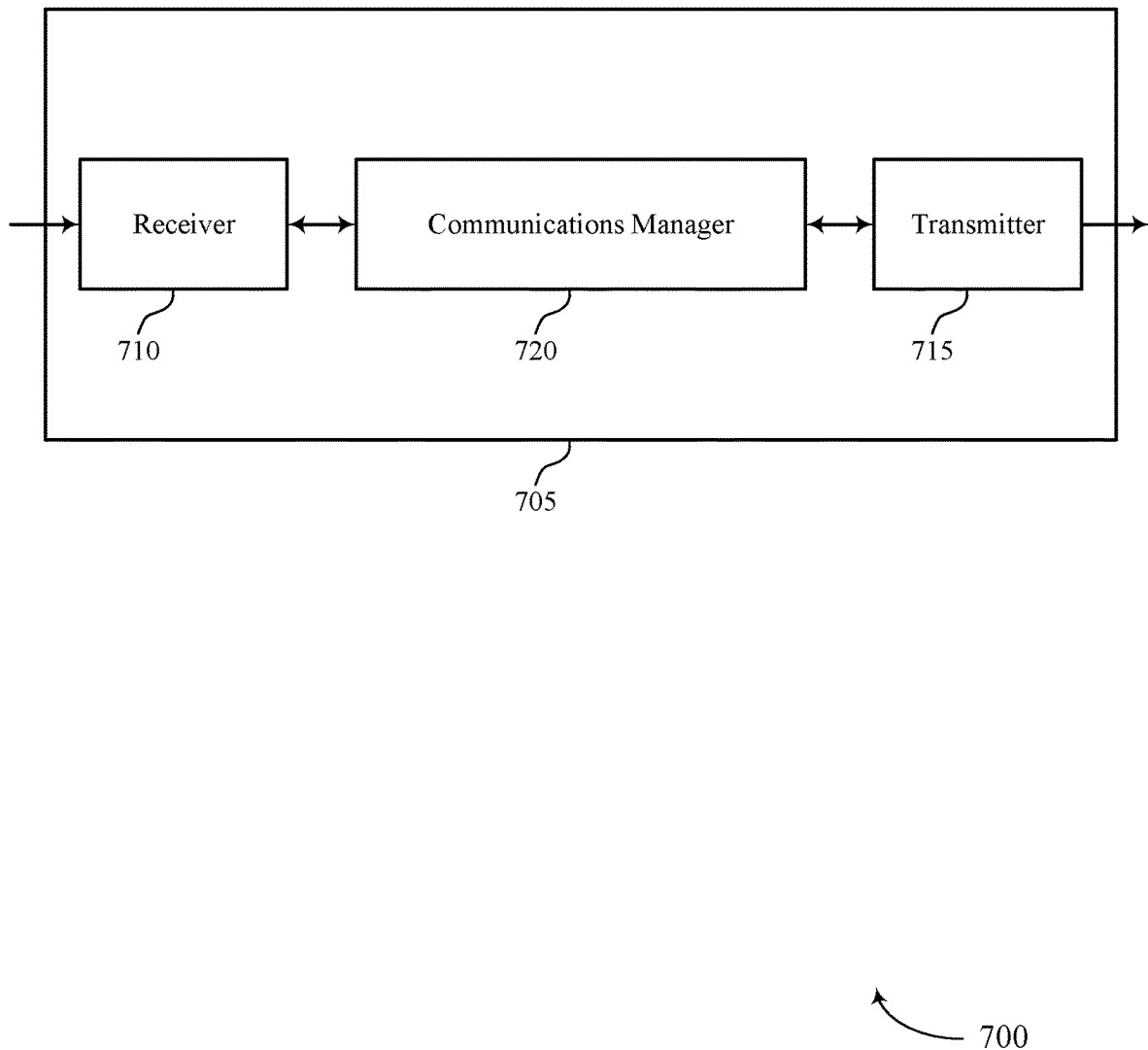
FIGS. 7 and 8 show block diagrams of devices that support power headroom reporting for uplink carrier aggregation communications in accordance with one or more aspects of the present disclosure.

FIG. 7 shows a block diagram 700 of a device 705 that supports power headroom reporting for uplink carrier aggregation communications in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to power headroom reporting for uplink carrier aggregation communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to power headroom reporting for uplink carrier aggregation communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of power headroom reporting for uplink carrier aggregation communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for receiving a first message indicating a set of multiple component carriers are configured for communications at the UE. The communications manager 720 may be configured as or otherwise support a means for determining a first transmission power available for uplink carrier aggregation transmissions by the UE across the set of multiple component carriers during a transmission occasion. The communications manager 720 may be configured as or otherwise support a means for transmitting, via at least a first component carrier of the set of multiple component carriers, a power headroom report including a carrier aggregation power headroom parameter, where a value of the carrier aggregation power headroom parameter may be based on the first transmission power available across the set of multiple component carriers during the transmission occasion and a second transmission power associated with the uplink carrier aggregation transmissions via at least one component carrier of the set of multiple component carriers during the transmission occasion.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources, among other advantages.

Figure 8:
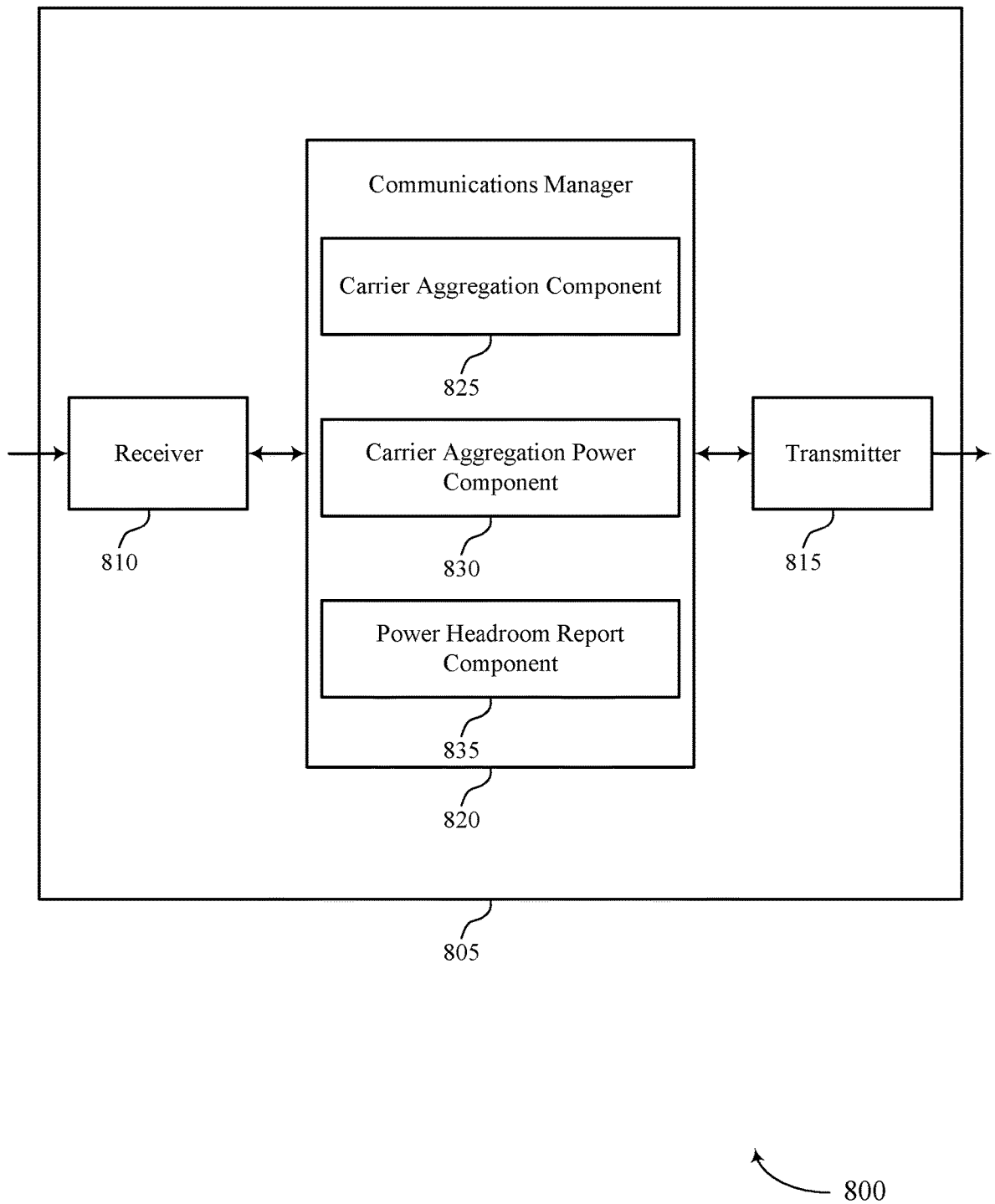

FIG. 8 shows a block diagram 800 of a device 805 that supports power headroom reporting for uplink carrier aggregation communications in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to power headroom reporting for uplink carrier aggregation communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to power headroom reporting for uplink carrier aggregation communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of power headroom reporting for uplink carrier aggregation communications as described herein. For example, the communications manager 820 may include a carrier aggregation component 825, a carrier aggregation power component 830, a power headroom report component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The carrier aggregation component 825 may be configured as or otherwise support a means for receiving a first message indicating a set of multiple component carriers are configured for communications at the UE. The carrier aggregation power component 830 may be configured as or otherwise support a means for determining a first transmission power available for uplink carrier aggregation transmissions by the UE across the set of multiple component carriers during a transmission occasion. The power headroom report component 835 may be configured as or otherwise support a means for transmitting, via at least a first component carrier of the set of multiple component carriers, a power headroom report including a carrier aggregation power headroom parameter, where a value of the carrier aggregation power headroom parameter may be based on the first transmission power available across the set of multiple component carriers during the transmission occasion and a second transmission power associated with the uplink carrier aggregation transmissions via at least one component carrier of the set of multiple component carriers during the transmission occasion.

Figure 9:
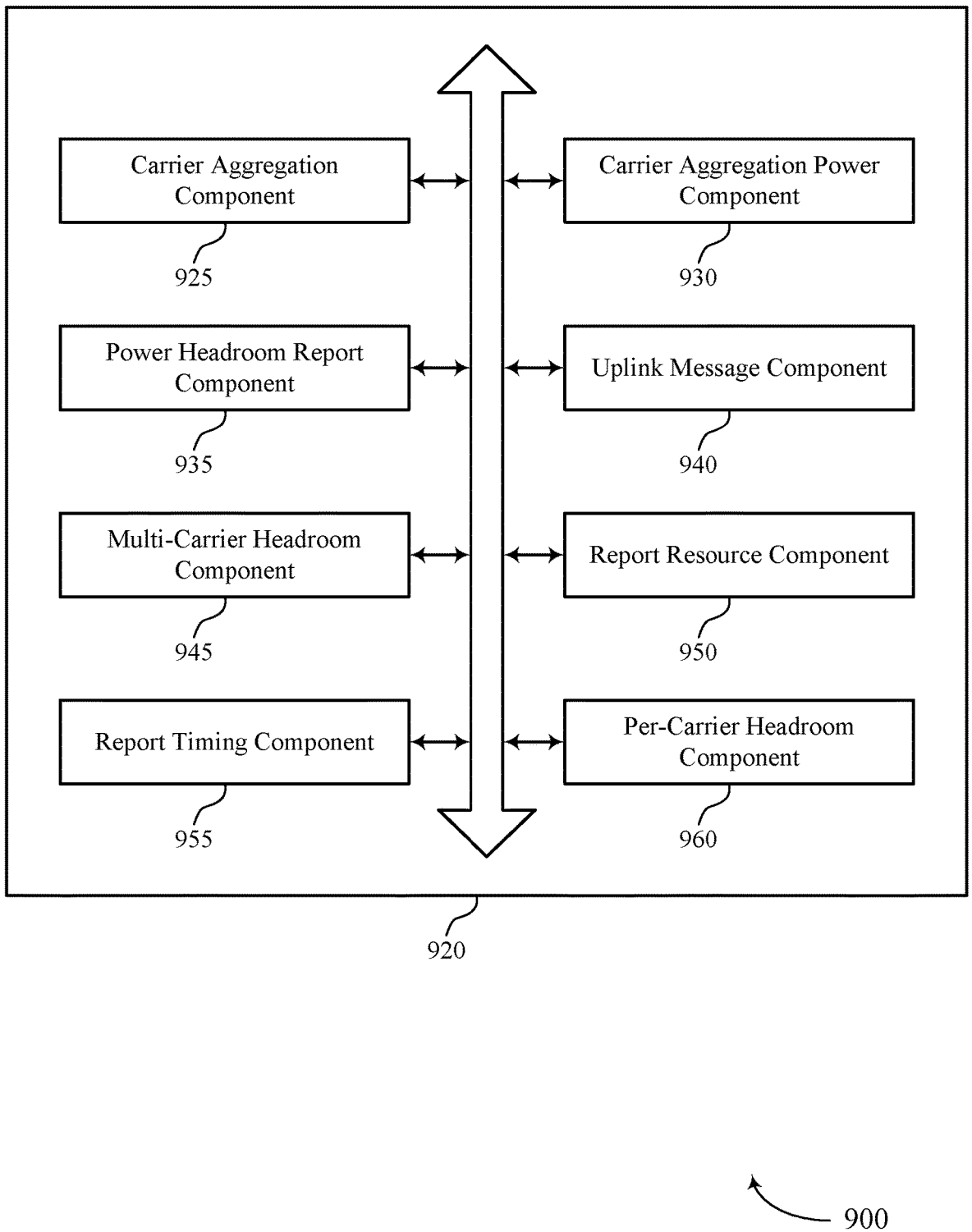
FIG. 9 shows a block diagram of a communications manager that supports power headroom reporting for uplink carrier aggregation communications in accordance with one or more aspects of the present disclosure.

FIG. 9 shows a block diagram 900 of a communications manager 920 that supports power headroom reporting for uplink carrier aggregation communications in accordance with one or more aspects of the present disclosure. The communications manager 920 may be an example of aspects of a communications manager 720, a communications manager 820, or both, as described herein. The communications manager 920, or various components thereof, may be an example of means for performing various aspects of power headroom reporting for uplink carrier aggregation communications as described herein. For example, the communications manager 920 may include a carrier aggregation component 925, a carrier aggregation power component 930, a power headroom report component 935, an uplink message component 940, a multi-carrier headroom component 945, a report resource component 950, a report timing component 955, a per-carrier headroom component 960, or any combination thereof. Each of these components may communicate, directly or indirectly, with one another (e.g., via one or more buses).

The communications manager 920 may support wireless communications at a UE in accordance with examples as disclosed herein. The carrier aggregation component 925 may be configured as or otherwise support a means for receiving a first message indicating a set of multiple component carriers are configured for communications at the UE. The carrier aggregation power component 930 may be configured as or otherwise support a means for determining a first transmission power available for uplink carrier aggregation transmissions by the UE across the set of multiple component carriers during a transmission occasion. The power headroom report component 935 may be configured as or otherwise support a means for transmitting, via at least a first component carrier of the set of multiple component carriers, a power headroom report including a carrier aggregation power headroom parameter, where a value of the carrier aggregation power headroom parameter may be based on the first transmission power available across the set of multiple component carriers during the transmission occasion and a second transmission power associated with the uplink carrier aggregation transmissions via at least one component carrier of the set of multiple component carriers during the transmission occasion.

In some examples, the uplink message component 940 may be configured as or otherwise support a means for transmitting an uplink message via at least the first component carrier of the set of multiple component carriers, the uplink message associated with the second transmission power. In some examples, the multi-carrier headroom component 945 may be configured as or otherwise support a means for calculating a difference between the first transmission power available across the set of multiple component carriers and the second transmission power, where the value of the carrier aggregation power headroom parameter indicates the difference.

In some examples, to support transmitting the power headroom report, the per-carrier headroom component 960 may be configured as or otherwise support a means for transmitting, via the power headroom report, the carrier aggregation power headroom parameter and a second power headroom parameter, where a value of the second power headroom parameter is based on a difference between a third transmission power available for uplink transmissions on the first component carrier and the second transmission power.

In some examples, the uplink message component 940 may be configured as or otherwise support a means for transmitting a second uplink message via a second component carrier of the set of multiple component carriers. In some examples, the multi-carrier headroom component 945 may be configured as or otherwise support a means for calculating a second difference between the first transmission power available across the set of multiple component carriers and a third transmission power associated with the second component carrier. In some examples, the multi-carrier headroom component 945 may be configured as or otherwise support a means for transmitting, via the second uplink message, a second carrier aggregation power headroom parameter, where a value of the second carrier aggregation power headroom parameter indicates the second difference.

In some examples, the multi-carrier headroom component 945 may be configured as or otherwise support a means for determining the second transmission power, the second transmission power corresponding to an amount of transmission power available for uplink transmissions on the first component carrier, where the value of the carrier aggregation power headroom parameter indicates a difference between the first transmission power available across the set of multiple component carriers and the second transmission power.

In some examples, the value of the carrier aggregation power headroom parameter indicates the first transmission power available for the uplink carrier aggregation transmissions by the UE across the set of multiple component carriers during the transmission occasion.

In some examples, the uplink message component 940 may be configured as or otherwise support a means for transmitting one or more uplink messages corresponding to the uplink carrier aggregation transmissions, each uplink message of the one or more uplink messages transmitted via a respective component carrier of the set of multiple component carriers and using a respective second transmission power. In some examples, the multi-carrier headroom component 945 may be configured as or otherwise support a means for calculating a difference between the first transmission power available across the set of multiple component carriers and a sum of the respective second transmission powers used for transmitting each of the one or more uplink messages, where the value of the carrier aggregation power headroom parameter indicates the difference.

In some examples, the multi-carrier headroom component 945 may be configured as or otherwise support a means for calculating the sum of the respective second transmission powers and one or more reference power levels, the one or more reference power levels associated with a subset of component carriers of the set of multiple component carriers that are different than the respective component carriers via which the one or more uplink messages are transmitted, where the one or more reference power levels are based on a reference power reduction parameter.

In some examples, the report resource component 950 may be configured as or otherwise support a means for receiving a control message that allocates a set of uplink channel resources for carrier aggregation power headroom reporting, where the power headroom report is transmitted via the set of uplink channel resources based on the control message.

In some examples, to support transmitting the power headroom report, the report resource component 950 may be configured as or otherwise support a means for transmitting the power headroom report via the first component carrier and a first cell, where the first component carrier and the first cell are configured for carrier aggregation power headroom reporting by the UE.

In some examples, to support transmitting the power headroom report, the report timing component 955 may be configured as or otherwise support a means for transmitting the power headroom report based on an expiration of a power headroom report timer, where the power headroom report timer includes a periodic timer, a prohibit timer, or both configured for power headroom reporting by the UE.

In some examples, the report timing component 955 may be configured as or otherwise support a means for determining to transmit the power headroom report via a set of resources allocated for power headroom reporting on the first component carrier based on the set of resources being after the expiration of the power headroom report timer and before other sets of resources allocated for power headroom reporting on other component carriers of the set of multiple component carriers. In some examples, the power headroom report timer includes the periodic timer, a periodicity of the periodic timer configured for carrier aggregation power headroom reporting, per-carrier power headroom reporting, or both.

In some examples, the report timing component 955 may be configured as or otherwise support a means for determining a difference between a first pathloss associated with at least one component carrier of the set of multiple component carriers at a first time and a second pathloss associated with the at least one component carrier at a second time. In some examples, the report timing component 955 may be configured as or otherwise support a means for comparing the difference with a pathloss threshold, where transmitting the power headroom report is based on the difference exceeding the pathloss threshold.

In some examples, the report timing component 955 may be configured as or otherwise support a means for determining a difference between a first value of a first MPR parameter associated with at least one component carrier of the set of multiple component carriers at a first time and a second value of the first MPR parameter associated with the at least one component carrier at a second time. In some examples, the report timing component 955 may be configured as or otherwise support a means for comparing the difference with a power reduction threshold, where transmitting the power headroom report is based on the difference exceeding the power reduction threshold.

Figure 10:
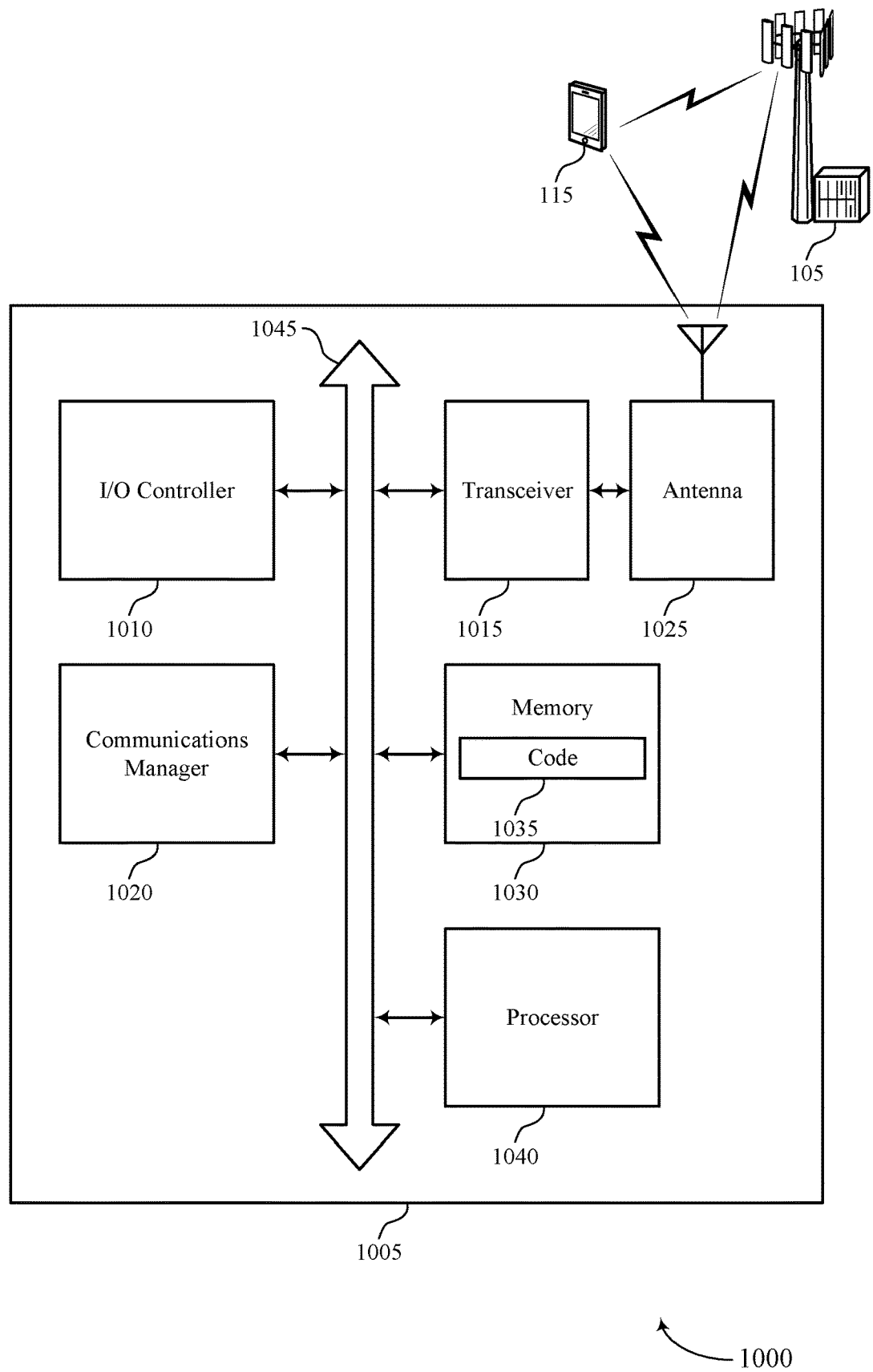
FIG. 10 shows a diagram of a system including a device that supports power headroom reporting for uplink carrier aggregation communications in accordance with one or more aspects of the present disclosure.

FIG. 10 shows a diagram of a system 1000 including a device 1005 that supports power headroom reporting for uplink carrier aggregation communications in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting power headroom reporting for uplink carrier aggregation communications). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving a first message indicating a set of multiple component carriers are configured for communications at the UE. The communications manager 1020 may be configured as or otherwise support a means for determining a first transmission power available for uplink carrier aggregation transmissions by the UE across the set of multiple component carriers during a transmission occasion. The communications manager 1020 may be configured as or otherwise support a means for transmitting, via at least a first component carrier of the set of multiple component carriers, a power headroom report including a carrier aggregation power headroom parameter, where a value of the carrier aggregation power headroom parameter may be based on the first transmission power available across the set of multiple component carriers during the transmission occasion and a second transmission power associated with the uplink carrier aggregation transmissions via at least one component carrier of the set of multiple component carriers during the transmission occasion.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, and longer battery life, among other advantages.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of power headroom reporting for uplink carrier aggregation communications as described herein, or the processor 1040 and the memory 1030 may be otherwise configured to perform or support such operations.

Figure 11:
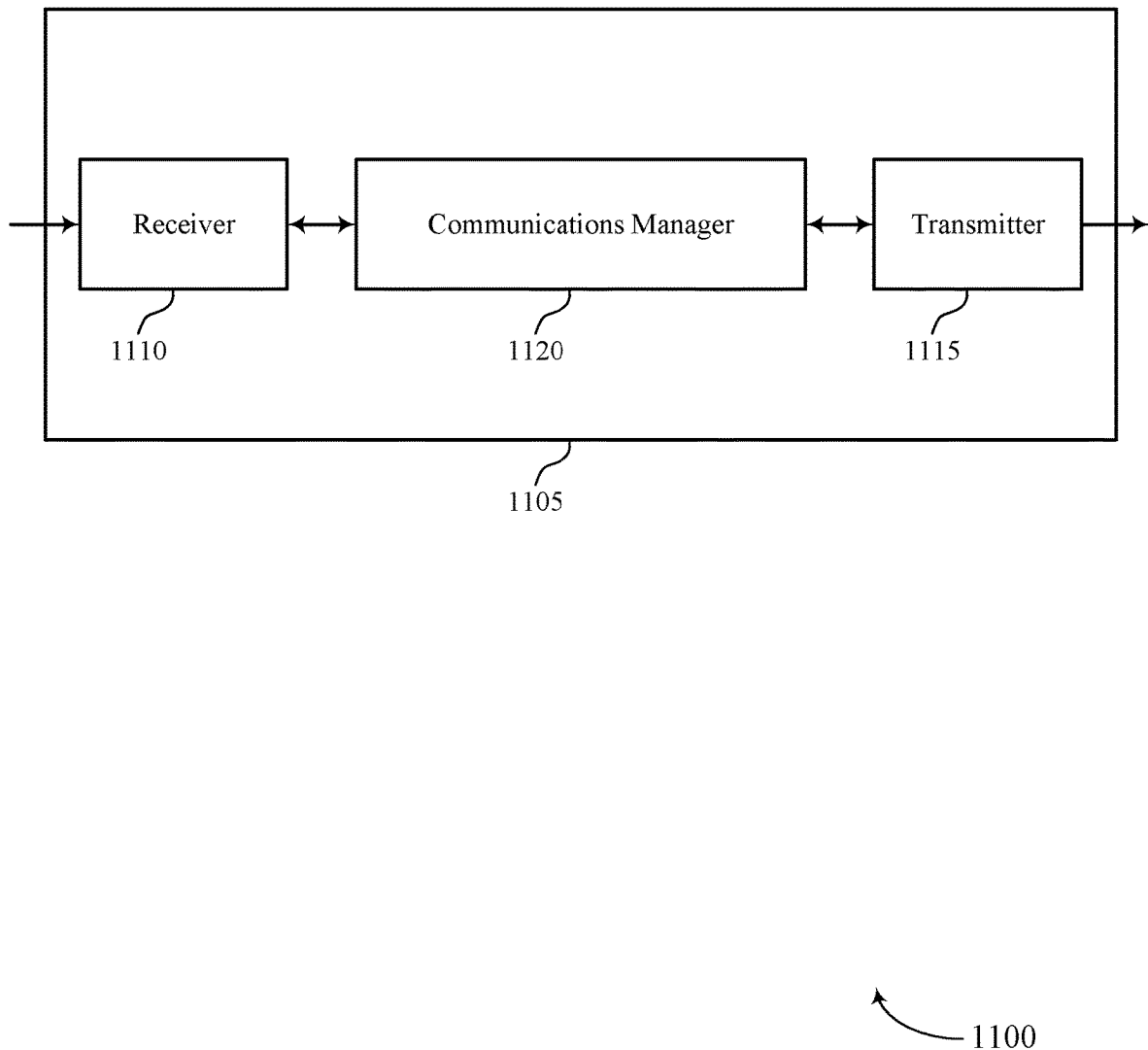
FIGS. 11 and 12 show block diagrams of devices that support power headroom reporting for uplink carrier aggregation communications in accordance with one or more aspects of the present disclosure.

FIG. 11 shows a block diagram 1100 of a device 1105 that supports power headroom reporting for uplink carrier aggregation communications in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of power headroom reporting for uplink carrier aggregation communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for transmitting a first message indicating a set of multiple component carriers are configured for communications at a UE. The communications manager 1120 may be configured as or otherwise support a means for receiving, via a first component carrier of the set of multiple component carriers and during a transmission occasion, an uplink message associated with a second transmission power. The communications manager 1120 may be configured as or otherwise support a means for receiving, via at least the first component carrier of the set of multiple component carriers, a power headroom report including a carrier aggregation power headroom parameter, where a value of the carrier aggregation power headroom parameter may be based on a first transmission power available for uplink transmissions by the UE across the set of multiple component carriers during the transmission occasion and the second transmission power associated with uplink carrier aggregation transmissions via at least the first component carrier during the transmission occasion.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and more efficient utilization of communication resources, among other advantages.

Figure 12:
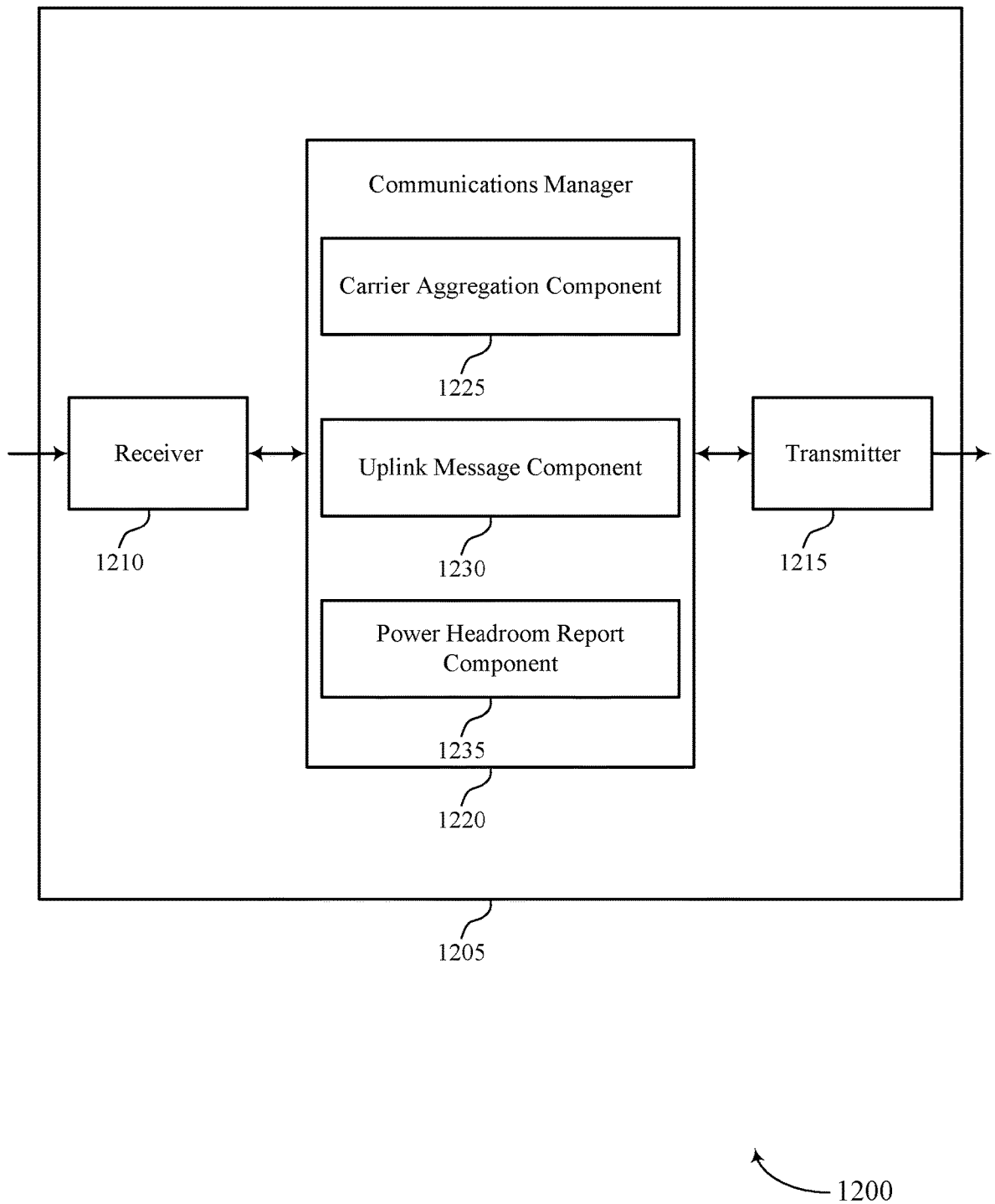

FIG. 12 shows a block diagram 1200 of a device 1205 that supports power headroom reporting for uplink carrier aggregation communications in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of power headroom reporting for uplink carrier aggregation communications as described herein. For example, the communications manager 1220 may include a carrier aggregation component 1225, an uplink message component 1230, a power headroom report component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The carrier aggregation component 1225 may be configured as or otherwise support a means for transmitting a first message indicating a set of multiple component carriers are configured for communications at a UE. The uplink message component 1230 may be configured as or otherwise support a means for receiving, via a first component carrier of the set of multiple component carriers and during a transmission occasion, an uplink message associated with a second transmission power. The power headroom report component 1235 may be configured as or otherwise support a means for receiving, via at least the first component carrier of the set of multiple component carriers, a power headroom report including a carrier aggregation power headroom parameter, where a value of the carrier aggregation power headroom parameter may be based on a first transmission power available for uplink transmissions by the UE across the set of multiple component carriers during the transmission occasion and the second transmission power associated with uplink carrier aggregation transmissions via at least the first component carrier during the transmission occasion.

Figure 13:
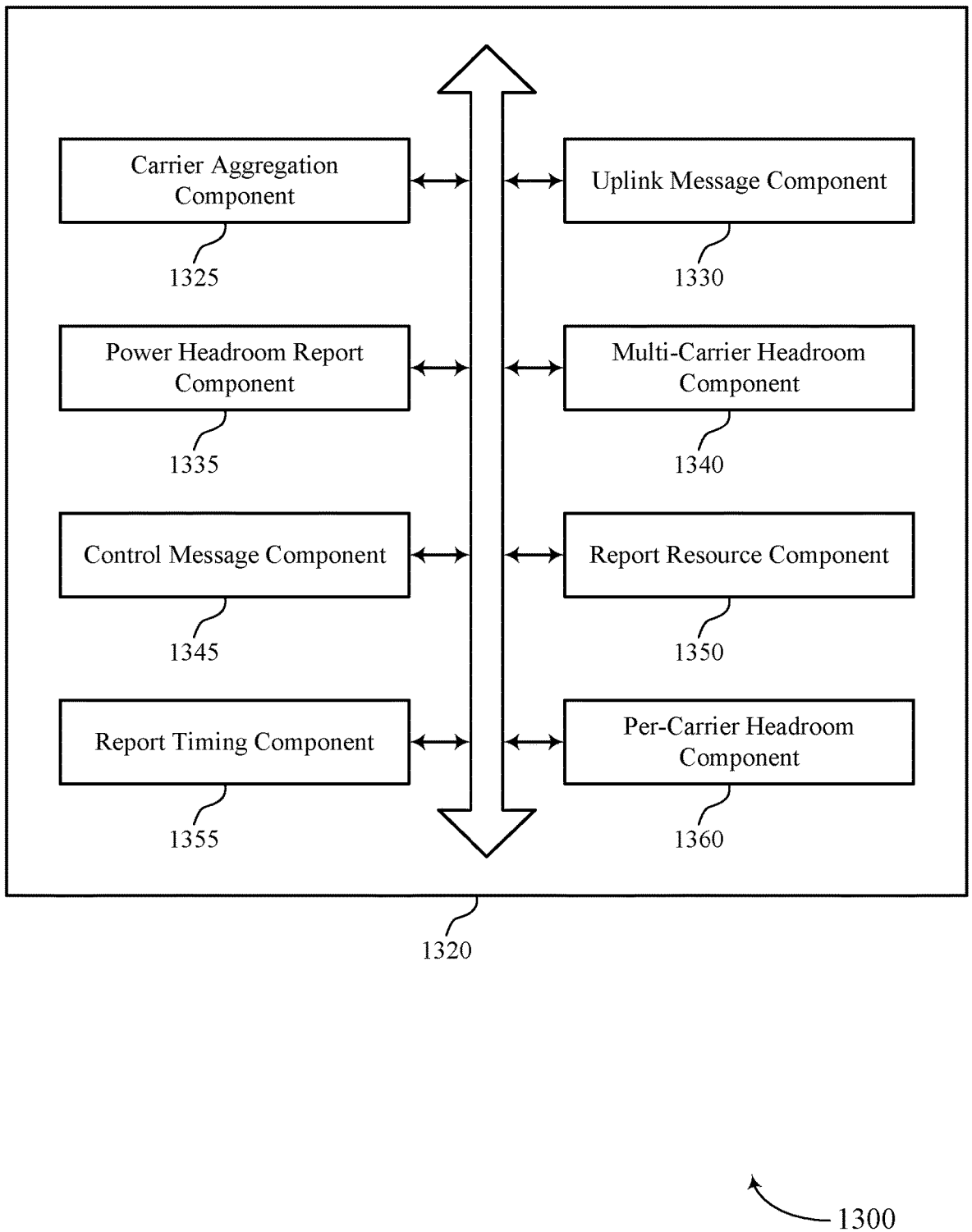
FIG. 13 shows a block diagram of a communications manager that supports power headroom reporting for uplink carrier aggregation communications in accordance with one or more aspects of the present disclosure.

FIG. 13 shows a block diagram 1300 of a communications manager 1320 that supports power headroom reporting for uplink carrier aggregation communications in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of power headroom reporting for uplink carrier aggregation communications as described herein. For example, the communications manager 1320 may include a carrier aggregation component 1325, an uplink message component 1330, a power headroom report component 1335, a multi-carrier headroom component 1340, a control message component 1345, a report resource component 1350, a report timing component 1355, a per-carrier headroom component 1360, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The carrier aggregation component 1325 may be configured as or otherwise support a means for transmitting a first message indicating a set of multiple component carriers are configured for communications at a UE. The uplink message component 1330 may be configured as or otherwise support a means for receiving, via a first component carrier of the set of multiple component carriers and during a transmission occasion, an uplink message associated with a second transmission power. The power headroom report component 1335 may be configured as or otherwise support a means for receiving, via at least the first component carrier of the set of multiple component carriers, a power headroom report including a carrier aggregation power headroom parameter, where a value of the carrier aggregation power headroom parameter may be based on a first transmission power available for uplink transmissions by the UE across the set of multiple component carriers during the transmission occasion and the second transmission power associated with uplink carrier aggregation transmissions via at least the first component carrier during the transmission occasion.

In some examples, the value of the carrier aggregation power headroom parameter is based on a difference between the first transmission power available across the set of multiple component carriers and the second transmission power associated with the uplink message received via the first component carrier. In some examples, to support receiving the power headroom report, the per-carrier headroom component 1360 may be configured as or otherwise support a means for receiving, via the power headroom report, the carrier aggregation power headroom parameter and a second power headroom parameter, where a value of the second power headroom parameter is based on a difference between a third transmission power available for uplink transmissions on the first component carrier and the second transmission power.

In some examples, the uplink message component 1330 may be configured as or otherwise support a means for receiving a second uplink message via a second component carrier of the set of multiple component carriers. In some examples, the power headroom report component 1335 may be configured as or otherwise support a means for receiving, via the second uplink message, a second carrier aggregation power headroom parameter, where a value of the second carrier aggregation power headroom parameter indicates a second difference between the first transmission power available across the set of multiple component carriers and a third transmission power associated with the second component carrier.

In some examples, the value of the carrier aggregation power headroom parameter indicates a difference between the first transmission power available across the set of multiple component carriers and a second transmission power available for uplink transmissions via the first component carrier. In some examples, the value of the carrier aggregation power headroom parameter indicates the first transmission power available across the set of multiple component carriers during the transmission occasion.

In some examples, the multi-carrier headroom component 1340 may be configured as or otherwise support a means for receiving one or more uplink messages including at least the uplink message, each uplink message of the one or more uplink messages received via a respective component carrier of the set of multiple component carriers and associated with a respective second transmission power, where the value of the carrier aggregation power headroom parameter is based on a difference between the first transmission power available across the set of multiple component carriers and a sum of the respective second transmission powers associated with each of the one or more uplink messages.

In some examples, the control message component 1345 may be configured as or otherwise support a means for transmitting a control message that allocates a set of uplink channel resources for carrier aggregation power headroom reporting, where the power headroom report is received via the set of uplink channel resources based on the control message.

In some examples, to support receiving the power headroom report, the report resource component 1350 may be configured as or otherwise support a means for receiving the power headroom report via the first component carrier and a first cell, where the first component carrier and the first cell are configured for carrier aggregation power headroom reporting.

In some examples, to support receiving the power headroom report, the report timing component 1355 may be configured as or otherwise support a means for receiving the power headroom report based on an expiration of a power headroom report timer, where the power headroom report timer includes a periodic timer, a prohibit timer, or both configured for power headroom reporting.

Figure 14:
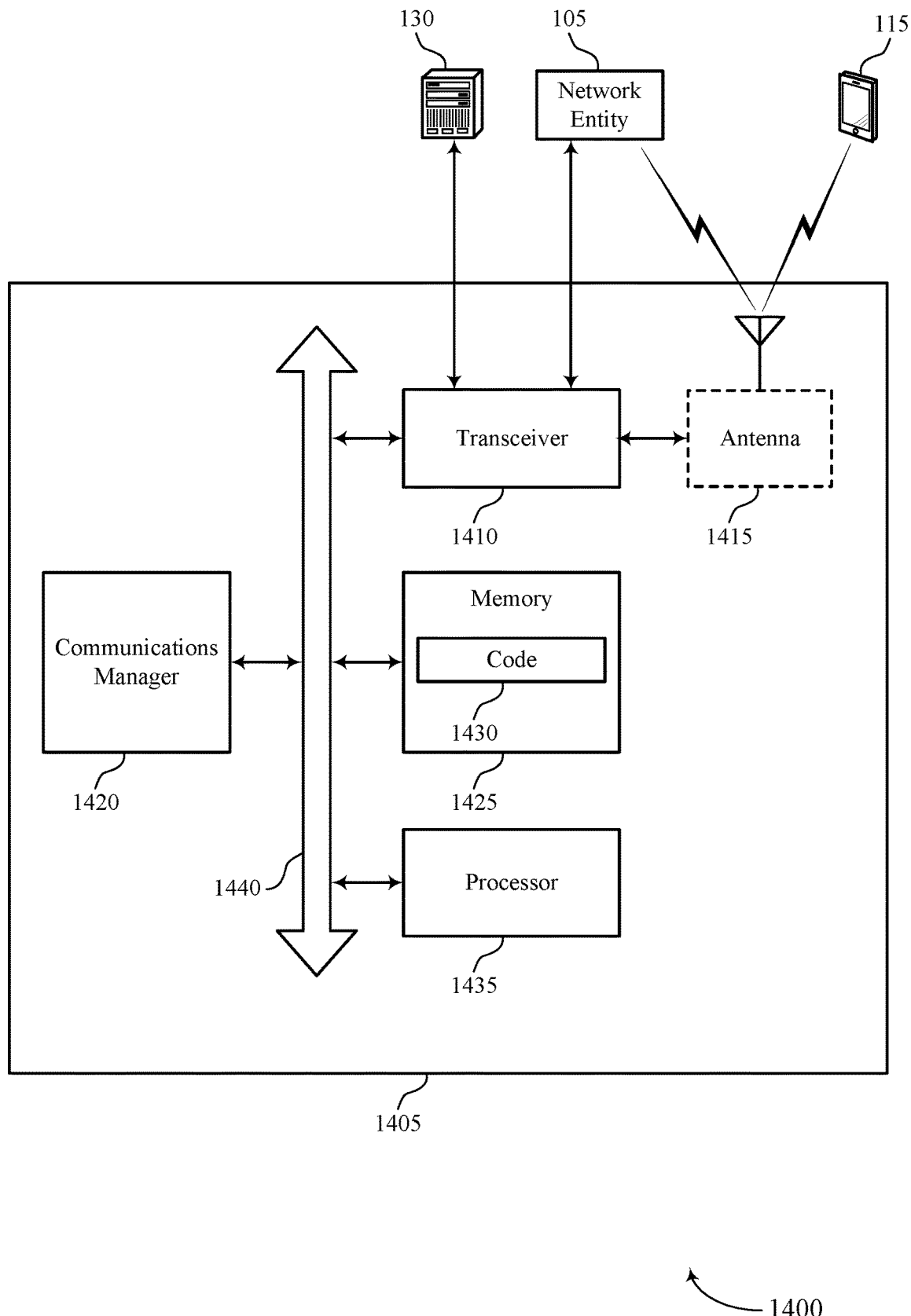
FIG. 14 shows a diagram of a system including a device that supports power headroom reporting for uplink carrier aggregation communications in accordance with one or more aspects of the present disclosure.

FIG. 14 shows a diagram of a system 1400 including a device 1405 that supports power headroom reporting for uplink carrier aggregation communications in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting power headroom reporting for uplink carrier aggregation communications). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1405 may transmit information output from the chip or modem. In some implementations, the second interface may refer to an interface between the processing system of the chip or modem and a receiver, such that the device 1405 may obtain information or signal inputs, and the information may be passed to the processing system. A person having ordinary skill in the art will readily recognize that the first interface also may obtain information or signal inputs, and the second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for transmitting a first message indicating a set of multiple component carriers are configured for communications at a UE. The communications manager 1420 may be configured as or otherwise support a means for receiving, via a first component carrier of the set of multiple component carriers and during a transmission occasion, an uplink message associated with a second transmission power. The communications manager 1420 may be configured as or otherwise support a means for receiving, via at least the first component carrier of the set of multiple component carriers, a power headroom report including a carrier aggregation power headroom parameter, where a value of the carrier aggregation power headroom parameter may be based on a first transmission power available for uplink transmissions by the UE across the set of multiple component carriers during the transmission occasion and the second transmission power associated with uplink carrier aggregation transmissions via at least the first component carrier during the transmission occasion.

By including or configuring the communications manager 1420 in accordance with examples as described herein, the device 1405 may support techniques for improved communication reliability, reduced latency, reduced power consumption, more efficient utilization of communication resources, improved coordination between devices, and longer battery life, among other advantages.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of power headroom reporting for uplink carrier aggregation communications as described herein, or the processor 1435 and the memory 1425 may be otherwise configured to perform or support such operations.

Figure 15:
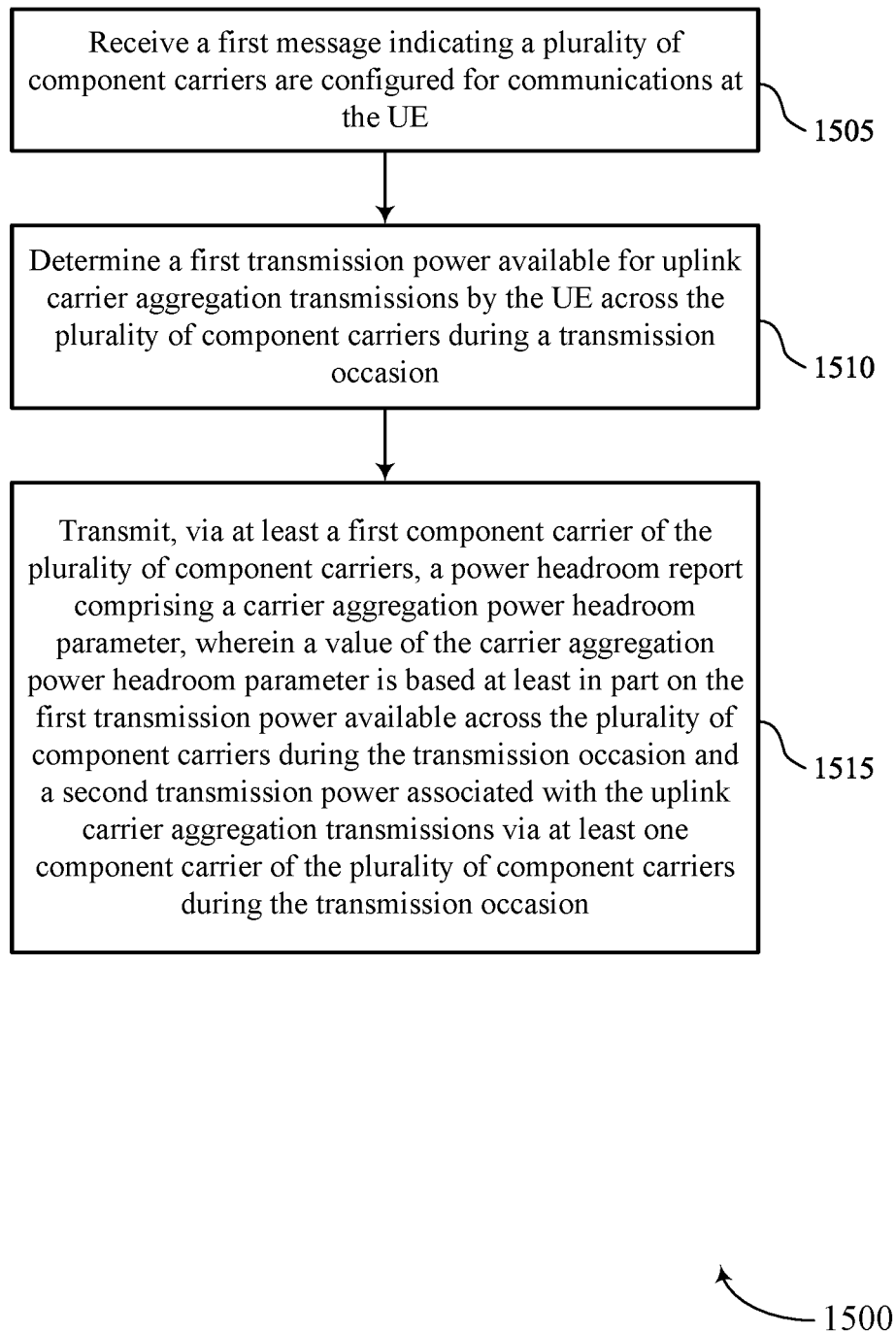
FIGS. 15 through 20 show flowcharts illustrating methods that support power headroom reporting for uplink carrier aggregation communications in accordance with one or more aspects of the present disclosure.

FIG. 15 shows a flowchart illustrating a method 1500 that supports power headroom reporting for uplink carrier aggregation communications in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a first message indicating a plurality of component carriers are configured for communications at the UE. The operations of 1505 may be performed in accordance with examples as disclosed herein. In some examples, aspects of the operations of 1505 may be performed by a carrier aggregation component 925 as described with reference to FIG. 9.

At 1510, the method may include determining a first transmission power available for uplink carrier aggregation transmissions by the UE across the plurality of component carriers during a transmission occasion. The operations of 1510 may be performed in accordance with examples as disclosed herein. In some examples, aspects of the operations of 1510 may be performed by a carrier aggregation power component 930 as described with reference to FIG. 9.

At 1515, the method may include transmitting, via at least a first component carrier of the plurality of component carriers, a power headroom report including a carrier aggregation power headroom parameter, wherein a value of the carrier aggregation power headroom parameter is based at least in part on the first transmission power available across the plurality of component carriers during the transmission occasion and a second transmission power associated with the uplink carrier aggregation transmissions via at least one component carrier of the set of multiple component carriers during the transmission occasion. The operations of 1515 may be performed in accordance with examples as disclosed herein. In some examples, aspects of the operations of 1515 may be performed by a power headroom report component 935 as described with reference to FIG. 9.

Figure 16:
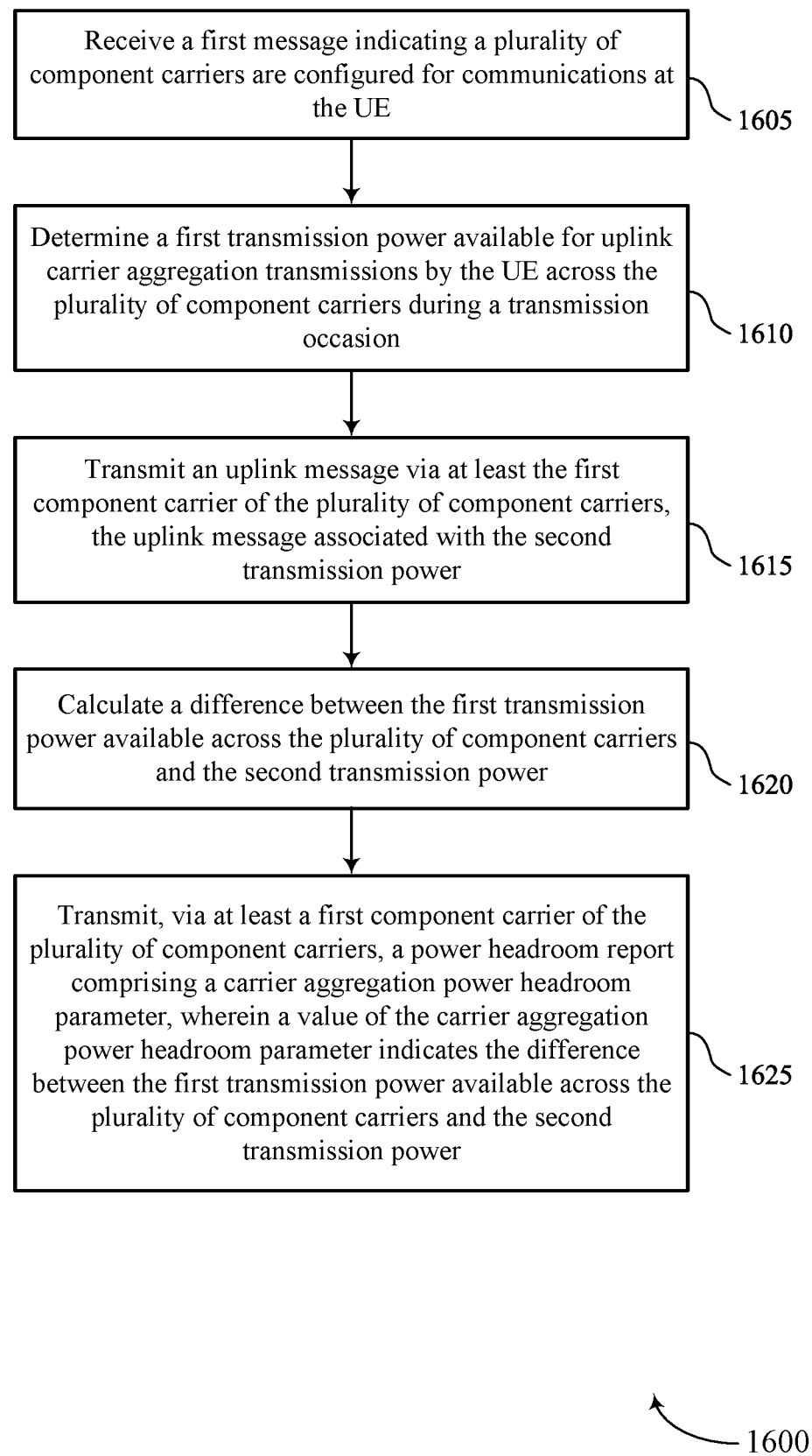

FIG. 16 shows a flowchart illustrating a method 1600 that supports power headroom reporting for uplink carrier aggregation communications in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving a first message indicating a plurality of component carriers are configured for communications at the UE. The operations of 1605 may be performed in accordance with examples as disclosed herein. In some examples, aspects of the operations of 1605 may be performed by a carrier aggregation component 925 as described with reference to FIG. 9.

At 1610, the method may include determining a first transmission power available for uplink carrier aggregation transmissions by the UE across the plurality of component carriers during a transmission occasion. The operations of 1610 may be performed in accordance with examples as disclosed herein. In some examples, aspects of the operations of 1610 may be performed by a carrier aggregation power component 930 as described with reference to FIG. 9.

At 1615, the method may include transmitting an uplink message via at least the first component carrier of the plurality of component carriers, the uplink message associated with the second transmission power. The operations of 1615 may be performed in accordance with examples as disclosed herein. In some examples, aspects of the operations of 1615 may be performed by an uplink message component 940 as described with reference to FIG. 9.

At 1620, the method may include calculating a difference between the first transmission power available across the plurality of multiple component carriers and the second transmission power. The operations of 1620 may be performed in accordance with examples as disclosed herein. In some examples, aspects of the operations of 1620 may be performed by a multi-carrier headroom component 945 as described with reference to FIG. 9.

At 1625, the method may include transmitting, via at least a first component carrier of the plurality of multiple component carriers, a power headroom report including a carrier aggregation power headroom parameter, wherein the value of the carrier aggregation power headroom parameter indicates the difference between the first transmission power available across the plurality of component carriers and the second transmission power. The operations of 1625 may be performed in accordance with examples as disclosed herein. In some examples, aspects of the operations of 1625 may be performed by a power headroom report component 935 as described with reference to FIG. 9.

Figure 17:
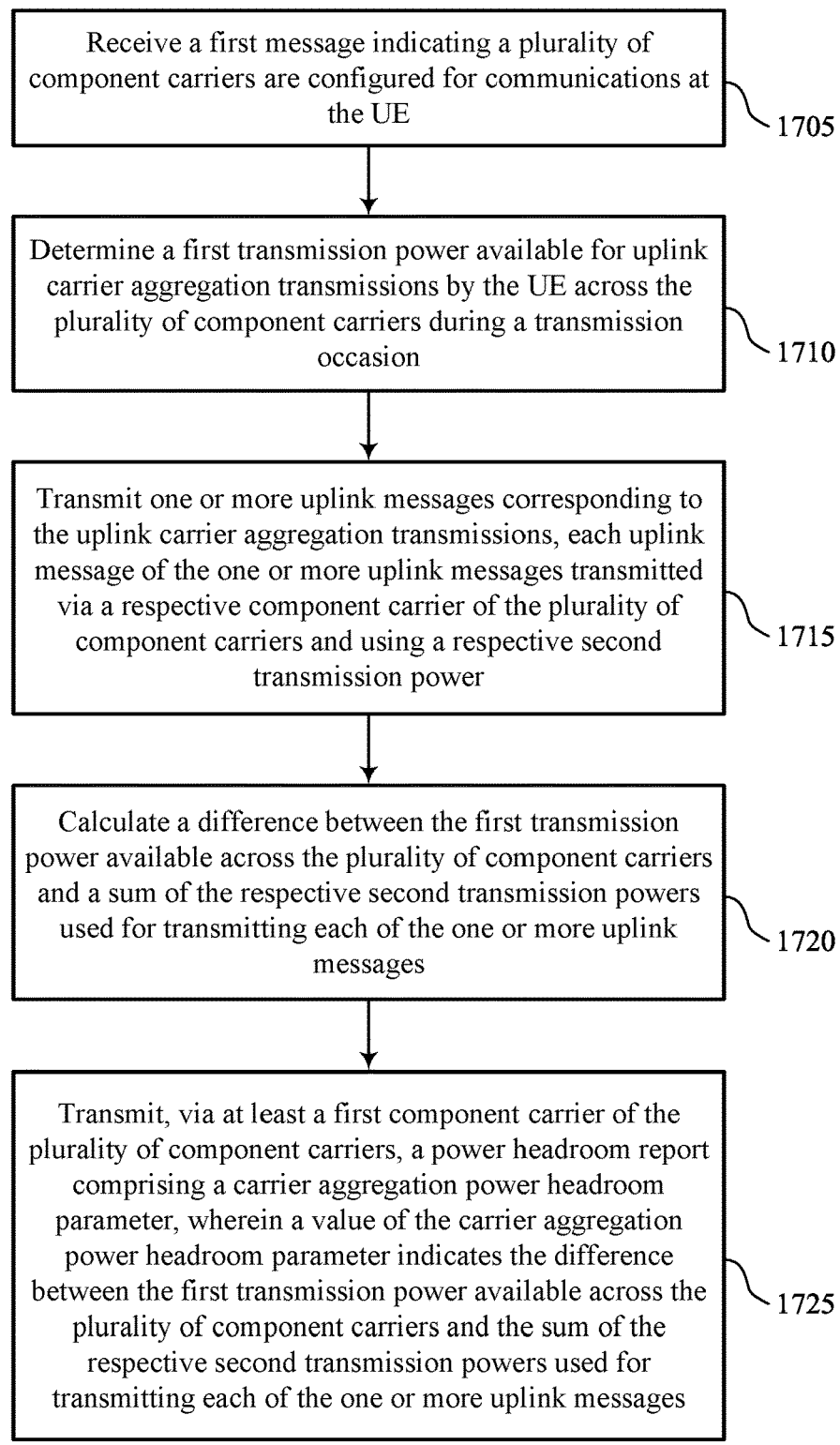

FIG. 17 shows a flowchart illustrating a method 1700 that supports power headroom reporting for uplink carrier aggregation communications in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving a first message indicating a plurality of component carriers are configured for communications at the UE. The operations of 1705 may be performed in accordance with examples as disclosed herein. In some examples, aspects of the operations of 1705 may be performed by a carrier aggregation component 925 as described with reference to FIG. 9.

At 1710, the method may include determining a first transmission power available for uplink carrier aggregation transmissions by the UE across the plurality of component carriers during a transmission occasion. The operations of 1710 may be performed in accordance with examples as disclosed herein. In some examples, aspects of the operations of 1710 may be performed by a carrier aggregation power component 930 as described with reference to FIG. 9.

At 1715, the method may include transmitting one or more uplink messages corresponding to the uplink carrier aggregation transmissions, each uplink message of the one or more uplink messages transmitted via a respective component carrier of the plurality of component carriers and using a respective second transmission power. The operations of 1715 may be performed in accordance with examples as disclosed herein. In some examples, aspects of the operations of 1715 may be performed by an uplink message component 940 as described with reference to FIG. 9.

At 1720, the method may include calculating a difference between the first transmission power available across the plurality of component carriers and a sum of the respective second transmission powers used for transmitting each of the one or more uplink messages. The operations of 1720 may be performed in accordance with examples as disclosed herein. In some examples, aspects of the operations of 1720 may be performed by a multi-carrier headroom component 945 as described with reference to FIG. 9.

At 1725, the method may include transmitting, via at least a first component carrier of the set of multiple component carriers, a power headroom report including a carrier aggregation power headroom parameter, wherein a value of the carrier aggregation power headroom parameter indicates the difference between the first transmission power available across the plurality of component carriers and the sum of the respective second transmission powers used for transmitting each of the one or more uplink messages. The operations of 1725 may be performed in accordance with examples as disclosed herein. In some examples, aspects of the operations of 1725 may be performed by a power headroom report component 935 as described with reference to FIG. 9.

Figure 18:
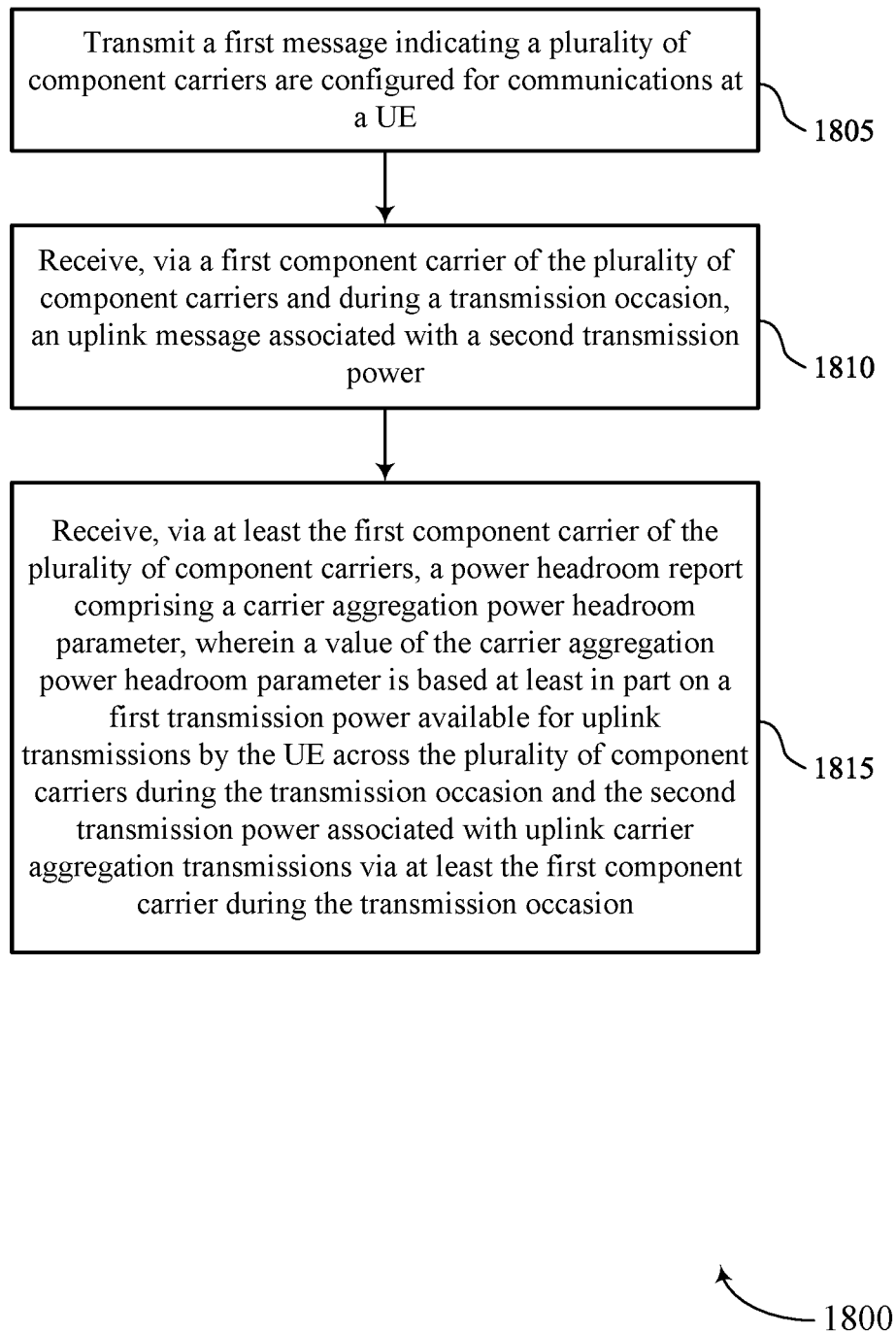

FIG. 18 shows a flowchart illustrating a method 1800 that supports power headroom reporting for uplink carrier aggregation communications in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a first message indicating a plurality of component carriers are configured for communications at a UE. The operations of 1805 may be performed in accordance with examples as disclosed herein. In some examples, aspects of the operations of 1805 may be performed by a carrier aggregation component 1325 as described with reference to FIG. 13.

At 1810, the method may include receiving, via a first component carrier of the plurality of multiple component carriers and during a transmission occasion, an uplink message associated with a second transmission power. The operations of 1810 may be performed in accordance with examples as disclosed herein. In some examples, aspects of the operations of 1810 may be performed by an uplink message component 1330 as described with reference to FIG. 13.

At 1815, the method may include receiving, via at least the first component carrier of the set of multiple component carriers, a power headroom report including a carrier aggregation power headroom parameter, wherein a value of the carrier aggregation power headroom parameter is based at least in part on a first transmission power available for uplink transmissions by the UE across the plurality of component carriers during the transmission occasion and the second transmission power associated with uplink carrier aggregation transmissions via at least the first component carrier during the transmission occasion. The operations of 1815 may be performed in accordance with examples as disclosed herein. In some examples, aspects of the operations of 1815 may be performed by a power headroom report component 1335 as described with reference to FIG. 13.

Figure 19:
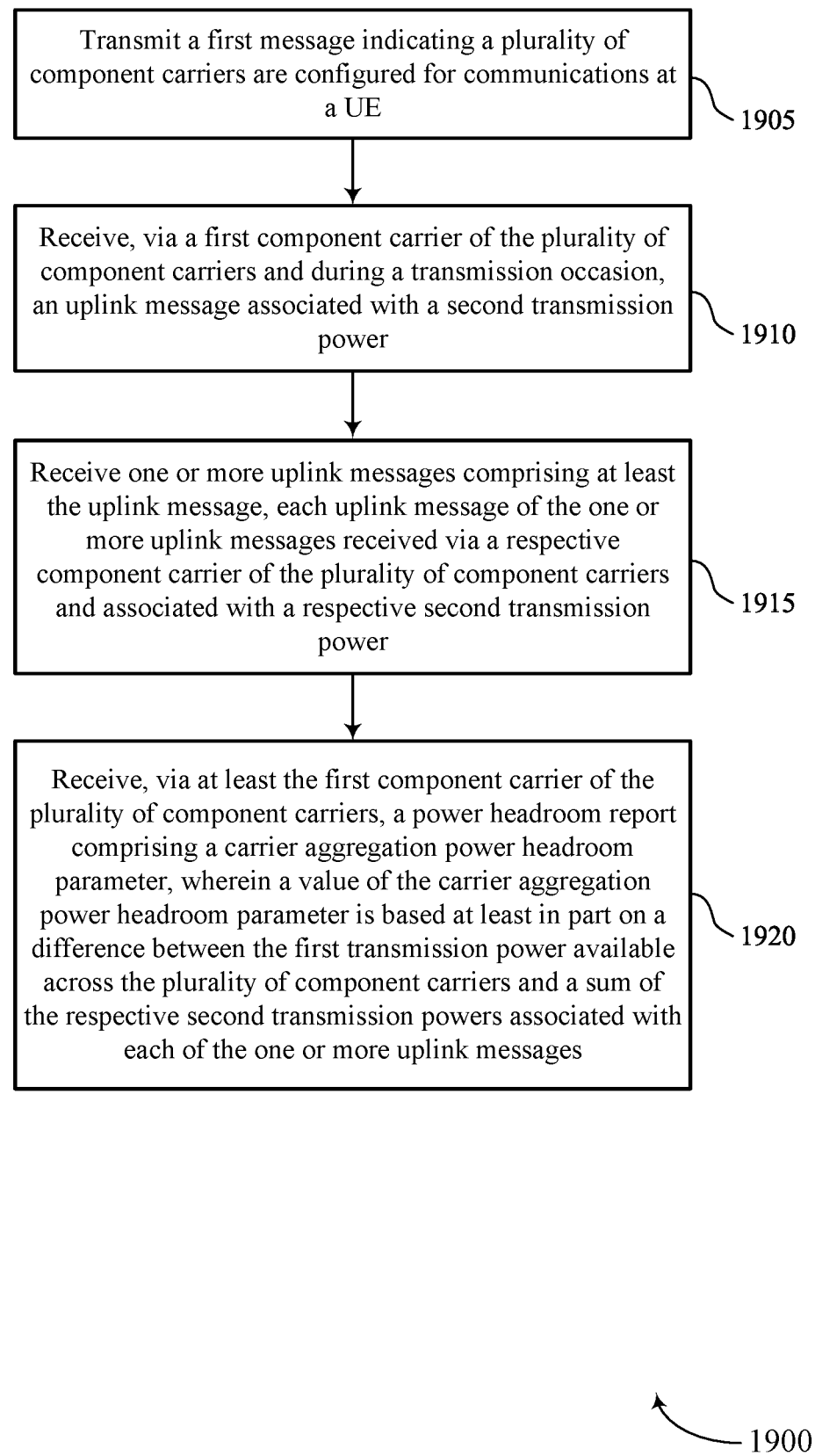

FIG. 19 shows a flowchart illustrating a method 1900 that supports power headroom reporting for uplink carrier aggregation communications in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a first message indicating a plurality of component carriers are configured for communications at a UE. The operations of 1905 may be performed in accordance with examples as disclosed herein. In some examples, aspects of the operations of 1905 may be performed by a carrier aggregation component 1325 as described with reference to FIG. 13.

At 1910, the method may include receiving, via a first component carrier of the plurality of component carriers and during a transmission occasion, an uplink message associated with a second transmission power. The operations of 1910 may be performed in accordance with examples as disclosed herein. In some examples, aspects of the operations of 1910 may be performed by an uplink message component 1330 as described with reference to FIG. 13.

At 1915, the method may include receiving one or more uplink messages including at least the uplink message, each uplink message of the one or more uplink messages received via a respective component carrier of the plurality of component carriers and associated with a respective second transmission power. The operations of 1915 may be performed in accordance with examples as disclosed herein. In some examples, aspects of the operations of 1915 may be performed by a multi-carrier headroom component 1340 as described with reference to FIG. 13.

At 1920, the method may include receiving, via at least the first component carrier of the set of multiple component carriers, a power headroom report including a carrier aggregation power headroom parameter, wherein a value of the carrier aggregation power headroom parameter is based at least in part on a difference between the first transmission power available across the plurality of component carriers and a sum of the respective second transmission powers associated with each of the one or more uplink messages. The operations of 1920 may be performed in accordance with examples as disclosed herein. In some examples, aspects of the operations of 1920 may be performed by a power headroom report component 1335 as described with reference to FIG. 13.

Figure 20:
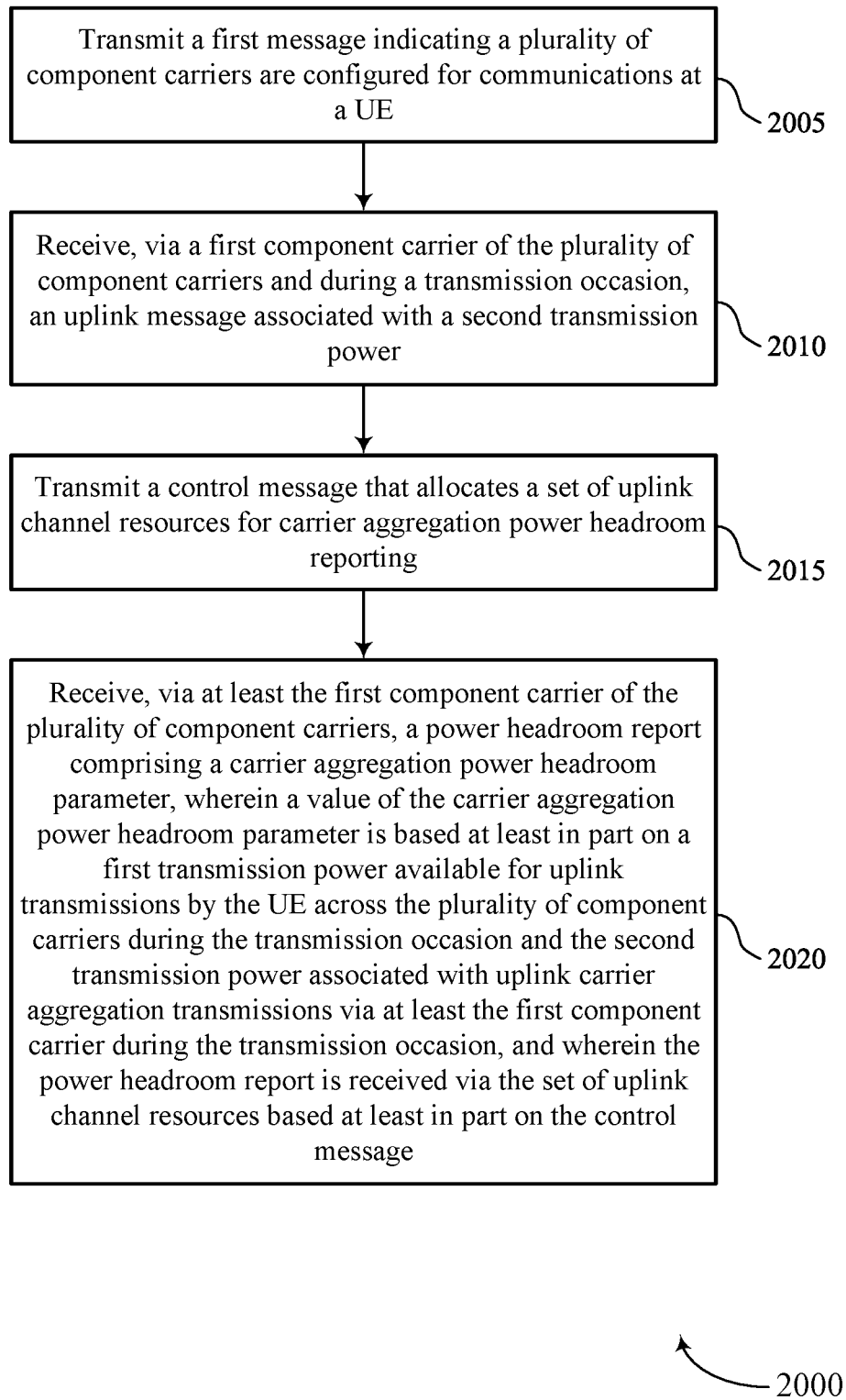

FIG. 20 shows a flowchart illustrating a method 2000 that supports power headroom reporting for uplink carrier aggregation communications in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include transmitting a first message indicating a plurality of component carriers are configured for communications at a UE. The operations of 2005 may be performed in accordance with examples as disclosed herein. In some examples, aspects of the operations of 2005 may be performed by a carrier aggregation component 1325 as described with reference to FIG. 13.

At 2010, the method may include receiving, via a first component carrier of the plurality of component carriers and during a transmission occasion, an uplink message associated with a second transmission power. The operations of 2010 may be performed in accordance with examples as disclosed herein. In some examples, aspects of the operations of 2010 may be performed by an uplink message component 1330 as described with reference to FIG. 13.

At 2015, the method may include transmitting a control message that allocates a set of uplink channel resources for carrier aggregation power headroom reporting. The operations of 2015 may be performed in accordance with examples as disclosed herein. In some examples, aspects of the operations of 2015 may be performed by a control message component 1345 as described with reference to FIG. 13.

At 2020, the method may include receiving, via at least the first component carrier of the plurality of component carriers, a power headroom report comprising a carrier aggregation power headroom parameter, wherein a value of the carrier aggregation power headroom parameter is based at least in part on a first transmission power available for uplink transmissions by the UE across the plurality of component carriers during the transmission occasion and the second transmission power associated with uplink carrier aggregation transmissions via at least the first component carrier during the transmission occasion, and wherein the power headroom report is received via the set of uplink channel resources based at least in part on the control message. The operations of 2020 may be performed in accordance with examples as disclosed herein. In some examples, aspects of the operations of 2020 may be performed by a power headroom report component 1335 as described with reference to FIG. 13.

The following provides an overview of aspects of the present disclosure:

Aspect 1: A method for wireless communications at a UE, comprising: receiving a first message indicating a plurality of component carriers are configured for communications at the UE; determining a first transmission power available for uplink carrier aggregation transmissions by the UE across the plurality of component carriers during a transmission occasion; and transmitting, via at least a first component carrier of the plurality of component carriers, a power headroom report comprising a carrier aggregation power headroom parameter, wherein a value of the carrier aggregation power headroom parameter is based at least in part on the first transmission power available across the plurality of component carriers during the transmission occasion and a second transmission power associated with the uplink carrier aggregation transmissions via at least one component carrier of the plurality of component carriers during the transmission occasion.

Aspect 2: The method of aspect 1, further comprising: transmitting an uplink message via at least the first component carrier of the plurality of component carriers, the uplink message associated with the second transmission power; and calculating a difference between the first transmission power available across the plurality of component carriers and the second transmission power, wherein the value of the carrier aggregation power headroom parameter indicates the difference.

Aspect 3: The method of aspect 2, wherein transmitting the power headroom report comprises: transmitting, via the power headroom report, the carrier aggregation power headroom parameter and a second power headroom parameter, wherein a value of the second power headroom parameter is based at least in part on a difference between a third transmission power available for uplink transmissions on the first component carrier and the second transmission power.

Aspect 4: The method of any of aspects 2 through 3, further comprising: transmitting a second uplink message via a second component carrier of the plurality of component carriers; calculating a second difference between the first transmission power available across the plurality of component carriers and a third transmission power associated with the second component carrier; and transmitting, via the second uplink message, a second carrier aggregation power headroom parameter, wherein a value of the second carrier aggregation power headroom parameter indicates the second difference.

Aspect 5: The method of any of aspects 1 through 4, further comprising: determining the second transmission power, the second transmission power corresponding to an amount of transmission power available for uplink transmissions on the first component carrier, wherein the value of the carrier aggregation power headroom parameter indicates a difference between the first transmission power available across the plurality of component carriers and the second transmission power.

Aspect 6: The method of any of aspects 1 through 4, wherein the value of the carrier aggregation power headroom parameter indicates the first transmission power available for the uplink carrier aggregation transmissions by the UE across the plurality of component carriers during the transmission occasion.

Aspect 7: The method of aspect 1, further comprising: transmitting one or more uplink messages corresponding to the uplink carrier aggregation transmissions, each uplink message of the one or more uplink messages transmitted via a respective component carrier of the plurality of component carriers and using a respective second transmission power; and calculating a difference between the first transmission power available across the plurality of component carriers and a sum of the respective second transmission powers used for transmitting each of the one or more uplink messages, wherein the value of the carrier aggregation power headroom parameter indicates the difference.

Aspect 8: The method of aspect 7, further comprising: calculating the sum of the respective second transmission powers and one or more reference power levels, the one or more reference power levels associated with a subset of component carriers of the plurality of component carriers that are different than the respective component carriers via which the one or more uplink messages are transmitted, wherein the one or more reference power levels are based at least in part on a reference power reduction parameter.

Aspect 9: The method of any of aspects 1 through 8, further comprising: receiving a control message that allocates a set of uplink channel resources for carrier aggregation power headroom reporting, wherein the power headroom report is transmitted via the set of uplink channel resources based at least in part on the control message.

Aspect 10: The method of any of aspects 1 through 8, wherein transmitting the power headroom report comprises: transmitting the power headroom report via the first component carrier and a first cell, wherein the first component carrier and the first cell are configured for carrier aggregation power headroom reporting by the UE.

Aspect 11: The method of any of aspects 1 through 10, wherein transmitting the power headroom report comprises: transmitting the power headroom report based at least in part on an expiration of a power headroom report timer, wherein the power headroom report timer comprises a periodic timer, a prohibit timer, or both configured for power headroom reporting by the UE.

Aspect 12: The method of aspect 11, further comprising: determining to transmit the power headroom report via a set of resources allocated for power headroom reporting on the first component carrier based at least in part on the set of resources being after the expiration of the power headroom report timer and before other sets of resources allocated for power headroom reporting on other component carriers of the plurality of component carriers.

Aspect 13: The method of any of aspects 11 through 12, wherein the power headroom report timer comprises the periodic timer, a periodicity of the periodic timer configured for carrier aggregation power headroom reporting, per-carrier power headroom reporting, or both.

Aspect 14: The method of any of aspects 1 through 13, further comprising: determining a difference between a first pathloss associated with at least one component carrier of the plurality of component carriers at a first time and a second pathloss associated with the at least one component carrier at a second time; and comparing the difference with a pathloss threshold, wherein transmitting the power headroom report is based at least in part on the difference exceeding the pathloss threshold.

Aspect 15: The method of any of aspects 1 through 13, further comprising: determining a difference between a first value of a first MPR parameter associated with at least one component carrier of the plurality of component carriers at a first time and a second value of the first MPR parameter associated with the at least one component carrier at a second time; and comparing the difference with a power reduction threshold, wherein transmitting the power headroom report is based at least in part on the difference exceeding the power reduction threshold.

Aspect 16: A method for wireless communications at a network entity, comprising: transmitting a first message indicating a plurality of component carriers are configured for communications at a UE; receiving, via a first component carrier of the plurality of component carriers and during a transmission occasion, an uplink message associated with a second transmission power; and receiving, via at least the first component carrier of the plurality of component carriers, a power headroom report comprising a carrier aggregation power headroom parameter, wherein a value of the carrier aggregation power headroom parameter is based at least in part on a first transmission power available for uplink transmissions by the UE across the plurality of component carriers during the transmission occasion and the second transmission power associated with uplink carrier aggregation transmissions via at least the first component carrier during the transmission occasion.

Aspect 17: The method of aspect 16, wherein the value of the carrier aggregation power headroom parameter is based at least in part on a difference between the first transmission power available across the plurality of component carriers and the second transmission power associated with the uplink message received via the first component carrier.

Aspect 18: The method of aspect 17, wherein receiving the power headroom report comprises: receiving, via the power headroom report, the carrier aggregation power headroom parameter and a second power headroom parameter, wherein a value of the second power headroom parameter is based at least in part on a difference between a third transmission power available for uplink transmissions on the first component carrier and the second transmission power.

Aspect 19: The method of any of aspects 17 through 18, further comprising: receiving a second uplink message via a second component carrier of the plurality of component carriers; and receiving, via the second uplink message, a second carrier aggregation power headroom parameter, wherein a value of the second carrier aggregation power headroom parameter indicates a second difference between the first transmission power available across the plurality of component carriers and a third transmission power associated with the second component carrier.

Aspect 20: The method of any of aspects 16 through 19, wherein the value of the carrier aggregation power headroom parameter indicates a difference between the first transmission power available across the plurality of component carriers and a second transmission power available for uplink transmissions via the first component carrier.

Aspect 21: The method of any of aspects 16 through 20, wherein the value of the carrier aggregation power headroom parameter indicates the first transmission power available across the plurality of component carriers during the transmission occasion.

Aspect 22: The method of aspect 16, further comprising: receiving one or more uplink messages comprising at least the uplink message, each uplink message of the one or more uplink messages received via a respective component carrier of the plurality of component carriers and associated with a respective second transmission power, wherein the value of the carrier aggregation power headroom parameter is based at least in part on a difference between the first transmission power available across the plurality of component carriers and a sum of the respective second transmission powers associated with each of the one or more uplink messages.

Aspect 23: The method of any of aspects 16 through 22, further comprising: transmitting a control message that allocates a set of uplink channel resources for carrier aggregation power headroom reporting, wherein the power headroom report is received via the set of uplink channel resources based at least in part on the control message.

Aspect 24: The method of any of aspects 16 through 23, wherein receiving the power headroom report comprises: receiving the power headroom report via the first component carrier and a first cell, wherein the first component carrier and the first cell are configured for carrier aggregation power headroom reporting.

Aspect 25: The method of any of aspects 16 through 24, wherein receiving the power headroom report comprises: receiving the power headroom report based at least in part on an expiration of a power headroom report timer, wherein the power headroom report timer comprises a periodic timer, a prohibit timer, or both configured for power headroom reporting.

Aspect 26: An apparatus for wireless communications at a UE, comprising a processor; memory coupled with the processor; and instructions stored in the memory and executable by the processor to cause the apparatus to perform a method of any of aspects 1 through 15.

Aspect 27: An apparatus for wireless communications at a UE, comprising at least one means for performing a method of any of aspects 1 through 15.

Aspect 28: A non-transitory computer-readable medium storing code for wireless communications at a UE, the code comprising instructions executable by a processor to perform a method of any of aspects 1 through 15.

Aspect 29: An apparatus for wireless communications at a network entity, comprising a processor; memory coupled with the processor; and instructions stored in the memory and executable by the processor to cause the apparatus to perform a method of any of aspects 16 through 25.

Aspect 30: An apparatus for wireless communications at a network entity, comprising at least one means for performing a method of any of aspects 16 through 25.

Aspect 31: A non-transitory computer-readable medium storing code for wireless communications at a network entity, the code comprising instructions executable by a processor to perform a method of any of aspects 16 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving a first message indicating a plurality of component carriers are configured for communications at the UE;
    determining a first transmission power available for uplink carrier aggregation transmissions by the UE across the plurality of component carriers during a transmission occasion; and
    transmitting, via at least a first component carrier of the plurality of component carriers, a power headroom report comprising a carrier aggregation power headroom parameter, wherein a value of the carrier aggregation power headroom parameter is based at least in part on the first transmission power available across the plurality of component carriers during the transmission occasion and a second transmission power associated with the uplink carrier aggregation transmissions via at least one component carrier of the plurality of component carriers during the transmission occasion.

2. The method of claim 1, further comprising:
transmitting an uplink message via at least the first component carrier of the plurality of component carriers, the uplink message associated with the second transmission power; and
calculating a difference between the first transmission power available across the plurality of component carriers and the second transmission power, wherein the value of the carrier aggregation power headroom parameter indicates the difference.

3. The method of claim 2, wherein transmitting the power headroom report comprises:
transmitting, via the power headroom report, the carrier aggregation power headroom parameter and a second power headroom parameter, wherein a value of the second power headroom parameter is based at least in part on a difference between a third transmission power available for uplink transmissions on the first component carrier and the second transmission power.

4. The method of claim 2, further comprising:
transmitting a second uplink message via a second component carrier of the plurality of component carriers;
calculating a second difference between the first transmission power available across the plurality of component carriers and a third transmission power associated with the second component carrier; and
transmitting, via the second uplink message, a second carrier aggregation power headroom parameter, wherein a value of the second carrier aggregation power headroom parameter indicates the second difference.

5. The method of claim 1, further comprising:
determining the second transmission power, the second transmission power corresponding to an amount of transmission power available for uplink transmissions on the first component carrier, wherein the value of the carrier aggregation power headroom parameter indicates a difference between the first transmission power available across the plurality of component carriers and the second transmission power.

6. The method of claim 1, wherein the value of the carrier aggregation power headroom parameter indicates the first transmission power available for the uplink carrier aggregation transmissions by the UE across the plurality of component carriers during the transmission occasion.

7. The method of claim 1, further comprising:
transmitting one or more uplink messages corresponding to the uplink carrier aggregation transmissions, each uplink message of the one or more uplink messages transmitted via a respective component carrier of the plurality of component carriers and using a respective second transmission power; and
calculating a difference between the first transmission power available across the plurality of component carriers and a sum of the respective second transmission powers used for transmitting each of the one or more uplink messages, wherein the value of the carrier aggregation power headroom parameter indicates the difference.

8. The method of claim 7, further comprising:
calculating the sum of the respective second transmission powers and one or more reference power levels, the one or more reference power levels associated with a subset of component carriers of the plurality of component carriers that are different than the respective component carriers via which the one or more uplink messages are transmitted, wherein the one or more reference power levels are based at least in part on a reference power reduction parameter.

9. The method of claim 1, further comprising:
receiving a control message that allocates a set of uplink channel resources for carrier aggregation power headroom reporting, wherein the power headroom report is transmitted via the set of uplink channel resources based at least in part on the control message.

10. The method of claim 1, wherein transmitting the power headroom report comprises:
transmitting the power headroom report via the first component carrier and a first cell, wherein the first component carrier and the first cell are configured for carrier aggregation power headroom reporting by the UE.

11. The method of claim 1, wherein transmitting the power headroom report comprises:
transmitting the power headroom report based at least in part on an expiration of a power headroom report timer, wherein the power headroom report timer comprises a periodic timer, a prohibit timer, or both configured for power headroom reporting by the UE.

12. The method of claim 11, further comprising:
determining to transmit the power headroom report via a set of resources allocated for power headroom reporting on the first component carrier based at least in part on the set of resources being after the expiration of the power headroom report timer and before other sets of resources allocated for power headroom reporting on other component carriers of the plurality of component carriers.

13. The method of claim 11, wherein the power headroom report timer comprises the periodic timer, a periodicity of the periodic timer configured for carrier aggregation power headroom reporting, per-carrier power headroom reporting, or both.

14. The method of claim 1, further comprising:
determining a difference between a first pathloss associated with at least one component carrier of the plurality of component carriers at a first time and a second pathloss associated with the at least one component carrier at a second time; and
comparing the difference with a pathloss threshold, wherein transmitting the power headroom report is based at least in part on the difference exceeding the pathloss threshold.

15. The method of claim 1, further comprising:
determining a difference between a first value of a first maximum power reduction parameter associated with at least one component carrier of the plurality of component carriers at a first time and a second value of the first maximum power reduction parameter associated with the at least one component carrier at a second time; and
comparing the difference with a power reduction threshold, wherein transmitting the power headroom report is based at least in part on the difference exceeding the power reduction threshold.

16. A method for wireless communications at a network entity, comprising:
transmitting a first message indicating a plurality of component carriers are configured for communications at a user equipment (UE);

receiving, via a first component carrier of the plurality of component carriers and during a transmission occasion, an uplink message associated with a second transmission power; and receiving, via at least the first component carrier of the plurality of component carriers, a power headroom report comprising a carrier aggregation power headroom parameter, wherein a value of the carrier aggregation power headroom parameter is based at least in part on a first transmission power available for uplink transmissions by the UE across the plurality of component carriers during the transmission occasion and the second transmission power associated with uplink carrier aggregation transmissions via at least the first component carrier during the transmission occasion.

17. The method of claim 16, wherein the value of the carrier aggregation power headroom parameter is based at least in part on a difference between the first transmission power available across the plurality of component carriers and the second transmission power associated with the uplink message received via the first component carrier.

18. The method of claim 17, wherein receiving the power headroom report comprises:

receiving, via the power headroom report, the carrier aggregation power headroom parameter and a second power headroom parameter, wherein a value of the second power headroom parameter is based at least in part on a difference between a third transmission power available for uplink transmissions on the first component carrier and the second transmission power.

19. The method of claim 17, further comprising:

receiving a second uplink message via a second component carrier of the plurality of component carriers; and receiving, via the second uplink message, a second carrier aggregation power headroom parameter, wherein a value of the second carrier aggregation power headroom parameter indicates a second difference between the first transmission power available across the plurality of component carriers and a third transmission power associated with the second component carrier.

20. The method of claim 16, wherein the value of the carrier aggregation power headroom parameter indicates a difference between the first transmission power available across the plurality of component carriers and a second transmission power available for uplink transmissions via the first component carrier.

21. The method of claim 16, wherein the value of the carrier aggregation power headroom parameter indicates the first transmission power available across the plurality of component carriers during the transmission occasion.

22. The method of claim 16, further comprising:

receiving one or more uplink messages comprising at least the uplink message, each uplink message of the one or more uplink messages received via a respective component carrier of the plurality of component carriers and associated with a respective second transmission power, wherein the value of the carrier aggregation power headroom parameter is based at least in part on a difference between the first transmission power available across the plurality of component carriers and a sum of the respective second transmission powers associated with each of the one or more uplink messages.

23. The method of claim 16, further comprising:

transmitting a control message that allocates a set of uplink channel resources for carrier aggregation power headroom reporting, wherein the power headroom report is received via the set of uplink channel resources based at least in part on the control message.

24. The method of claim 16, wherein receiving the power headroom report comprises:

receiving the power headroom report via the first component carrier and a first cell, wherein the first component carrier and the first cell are configured for carrier aggregation power headroom reporting.

25. The method of claim 16, wherein receiving the power headroom report comprises:

receiving the power headroom report based at least in part on an expiration of a power headroom report timer, wherein the power headroom report timer comprises a periodic timer, a prohibit timer, or both configured for power headroom reporting.

26. An apparatus for wireless communications at a user equipment (UE), comprising:

a processor; and a memory coupled with the processor, wherein the memory comprises instructions executable by the processor to cause the apparatus to:

receive a first message indicating a plurality of component carriers are configured for communications at the UE;

determine a first transmission power available for uplink carrier aggregation transmissions by the UE across the plurality of component carriers during a transmission occasion; and transmit, via at least a first component carrier of the plurality of component carriers, a power headroom report comprising a carrier aggregation power headroom parameter, wherein a value of the carrier aggregation power headroom parameter is based at least in part on the first transmission power available across the plurality of component carriers during the transmission occasion and a second transmission power associated with the uplink carrier aggregation transmissions via at least one component carrier of the plurality of component carriers during the transmission occasion.

27. The apparatus of claim 26, wherein the instructions are further executable by the processor to cause the apparatus to:

transmit an uplink message via at least the first component carrier of the plurality of component carriers, the uplink message associated with the second transmission power; and calculate a difference between the first transmission power available across the plurality of component carriers and the second transmission power, wherein the value of the carrier aggregation power headroom parameter indicates the difference.

28. The apparatus of claim 27, wherein the instructions to transmit the power headroom report are executable by the processor to cause the apparatus to:

transmit, via the power headroom report, the carrier aggregation power headroom parameter and a second power headroom parameter, wherein a value of the second power headroom parameter is based at least in part on a difference between a third transmission power available for uplink transmissions on the first component carrier and the second transmission power.

29. An apparatus for wireless communications at a network entity, comprising:

a processor; and a memory coupled with the processor, wherein the memory comprises instructions executable by the processor to cause the apparatus to:

transmit a first message indicating a plurality of component carriers are configured for communications at a user equipment (UE);

receive, via a first component carrier of the plurality of component carriers and during a transmission occasion, an uplink message associated with a second transmission power; and receive, via at least the first component carrier of the plurality of component carriers, a power headroom report comprising a carrier aggregation power headroom parameter, wherein a value of the carrier aggregation power headroom parameter is based at least in part on a first transmission power available for uplink transmissions by the UE across the plurality of component carriers during the transmission occasion and the second transmission power associated with uplink carrier aggregation transmissions via at least the first component carrier during the transmission occasion.

30. The apparatus of claim 29, wherein the value of the carrier aggregation power headroom parameter is based at least in part on a difference between the first transmission power available across the plurality of component carriers and the second transmission power associated with the uplink message received via the first component carrier.

\* \* \* \* \*